US011651301B2

(12) United States Patent
Vasvani

(10) Patent No.: US 11,651,301 B2
(45) Date of Patent: *May 16, 2023

(54) AUTOMATED GENERATION OF A PACKAGE DATA OBJECT

(71) Applicant: StubHub, Inc., San Francisco, CA (US)

(72) Inventor: Girish Vasvani, Fremont, CA (US)

(73) Assignee: StubHub, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/459,741

(22) Filed: Aug. 27, 2021

(65) Prior Publication Data

US 2021/0406783 A1    Dec. 30, 2021

Related U.S. Application Data

(63) Continuation of application No. 15/396,256, filed on Dec. 30, 2016, now Pat. No. 11,113,636.

(51) Int. Cl.
    *G06Q 10/02*    (2012.01)
(52) U.S. Cl.
    CPC .................... *G06Q 10/02* (2013.01)
(58) Field of Classification Search
    None
    See application file for complete search history.

(56) References Cited

U.S. PATENT DOCUMENTS

| 8,204,799 | B1 | 6/2012 | Murray et al. |
| 8,294,549 | B2 | 10/2012 | Samovar et al. |
| 2002/0026289 | A1 | 2/2002 | Kuzunuki |
| 2002/0082879 | A1 | 6/2002 | Miller et al. |
| 2003/0220981 | A1 | 11/2003 | Nakamura |
| 2004/0230440 | A1 | 11/2004 | Malhotra |

(Continued)

FOREIGN PATENT DOCUMENTS

| CN | 108604319 A | 9/2018 |
| WO | 2016196398 A1 | 12/2016 |
| WO | 2017136368 A1 | 8/2017 |

OTHER PUBLICATIONS

USPTO—International Search Report and Written Opinion related International Application No. PCT/US2016/034903, dated Sep. 1, earn, 12 pgs.

(Continued)

*Primary Examiner* — Tonya Joseph
(74) *Attorney, Agent, or Firm* — McDermott Will & Emery LLP

(57) ABSTRACT

A system for generating a package data object may include an electronic database including first and second entries. The system may also include a server configured to perform operations. The operations may include receiving filter criteria over from an electronic device, and based on the filter criteria, retrieving the first and second entries. The operations may also include comparing one or more attributes of the first and second entries, and based on the comparison, adding the first entry from the electronic database to a package object. The operations may further include, based on the filter criteria, retrieving third and fourth entries from the electronic database, and comparing one or more attributes of the third and fourth entries, and based on the comparison, adding the third entry from the electronic database to the package data object.

20 Claims, 10 Drawing Sheets

(56) References Cited

U.S. PATENT DOCUMENTS

| | | |
|---|---|---|
| 2005/0144115 A1 | 6/2005 | Brett |
| 2006/0116916 A1 | 6/2006 | Bowman et al. |
| 2006/0195361 A1 | 8/2006 | Rosenberg |
| 2007/0160004 A1 | 7/2007 | Sakhpara |
| 2007/0276944 A1 | 11/2007 | Samovar et al. |
| 2008/0281644 A1 | 11/2008 | Payne |
| 2009/0216571 A1 | 8/2009 | Sunshine et al. |
| 2010/0131530 A1 | 5/2010 | Gibson et al. |
| 2011/0040656 A1 | 2/2011 | Groetzinger et al. |
| 2011/0082804 A1 | 4/2011 | Swinson et al. |
| 2011/0282700 A1 | 11/2011 | Cockcroft |
| 2011/0320227 A1 | 12/2011 | Thomas et al. |
| 2012/0078667 A1 | 3/2012 | Denker et al. |
| 2012/0166231 A1 | 6/2012 | Denker et al. |
| 2012/0173310 A1 | 7/2012 | Groetzinger et al. |
| 2012/0185394 A1 | 7/2012 | Gelfand et al. |
| 2013/0124234 A1 | 5/2013 | Nilsson et al. |
| 2013/0185103 A1 | 7/2013 | Sunshine et al. |
| 2013/0339069 A1 | 12/2013 | Hampel et al. |
| 2015/0006208 A1 | 1/2015 | Nestor et al. |
| 2015/0051928 A1 | 2/2015 | Gibson et al. |
| 2015/0350680 A1 | 12/2015 | Yin et al. |
| 2016/0189060 A1 | 6/2016 | Ngo et al. |
| 2017/0193488 A1* | 7/2017 | Renke ................ G06Q 20/209 |
| 2017/0228663 A1 | 8/2017 | Lyon et al. |

OTHER PUBLICATIONS

USPTO—International Search Report and Written Opinion for related International Application No. PCT/US2017/015904, dated Apr. 21, 2017, 7 pgs.

* cited by examiner

AUTOMATED GENERATION OF A PACKAGE DATA OBJECT

CROSS-REFERENCE TO RELATED APPLICATIONS

This application claims priority under 35 U.S.C. § 120 as a continuation of U.S. patent application Ser. No. 15/396,256, filed Dec. 30, 2016 to Girish Vasvani, entitled "AUTOMATED GENERATION OF A PACKAGE DATA OBJECT," now U.S. Pat. No. 11,113,636, the disclosure of which is incorporated by reference in its entirety herein, for all purposes.

FIELD

Embodiments described in this disclosure generally relate to the automated generation of a data object.

BACKGROUND

Computer systems and networks have facilitated the tasks of buying, selling, and transferring goods. For example, global computer networks, such as the Internet, have allowed purchasers to relatively quickly and efficiently seek and purchase goods online. Similarly, global computer networks provide an efficient and cost-effective medium for sellers to advertise, offer, provide, and sell their goods. Electronic commerce companies provide buyers and sellers with online services and the infrastructure to accept orders of goods from remote purchasers, to perform the financial transactions necessary to confirm and complete the sale of goods, to ship or distribute the goods to remote purchasers, and to perform other related logistics. For these reasons, sellers actively use the Internet to offer, sell, and distribute a wide variety of goods to take advantage of the many benefits provided by the Internet and electronic commerce.

One example of a market for goods within the realm of electronic commerce is the online ticket market. Network-based systems may implement online ticket markets for buyers and sellers of tickets for live events such as sports, concerts, theater, and other entertainment events.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE FIGURES

Example embodiments will be described and explained with additional specificity and detail through the use of the accompanying drawings in which.

DESCRIPTION OF EMBODIMENTS

Purchasing a multi-ticket package has often been limited in a variety of ways. For example, primary sellers (e.g., the venue or original seller of a ticket) may require that an entire season of tickets be purchased. Alternatively, primary sellers may require a small number of pre-selected packages of multiple tickets be purchased. As a result, a user may be required to buy tickets for events the user knows beforehand they do not want to or cannot attend. Additionally, secondary sellers or resellers of tickets may only offer a single ticket at a time for sale. As a result, a user desiring to buy tickets for multiple events through one or more secondary sellers would have to go through the process of selecting tickets individually for each event. The technological difficulty in combining data from primary and secondary sellers into a multi-ticket package has limited the availability of multi-ticket packages.

One or more embodiments of the present disclosure relate to automatically generating a multi-element data object. For example, the present disclosure may include some embodiments that describe automatically generating a multi-ticket package for a user based on criteria or preferences specified by the user. The multi-ticket package may be customizable such that a user may purchase multiple tickets in a simplified manner. For example, a user may select one or more filter criteria (e.g., weekend games of top ten opponents) and an online marketplace may automatically generate a package data object for a multi-ticket package, with each ticket in the multi-ticket package represented by an object in the package data object. The user may be presented with a series of tickets that meet the filter criteria for purchase, for example, by using the package data object or a representation thereof. In these and other embodiments, the filter criteria may identify preferences of a user that relate to price and quality such that the tickets may fall within a particular deal score range. In some embodiments, one or more of the tickets may be discounted to fall within the filter criteria.

These and other embodiments are described with reference to the appended drawings in which like numbers indicate like features and structures unless described otherwise.

Generating a Multi-Ticket Package

Figure 1:
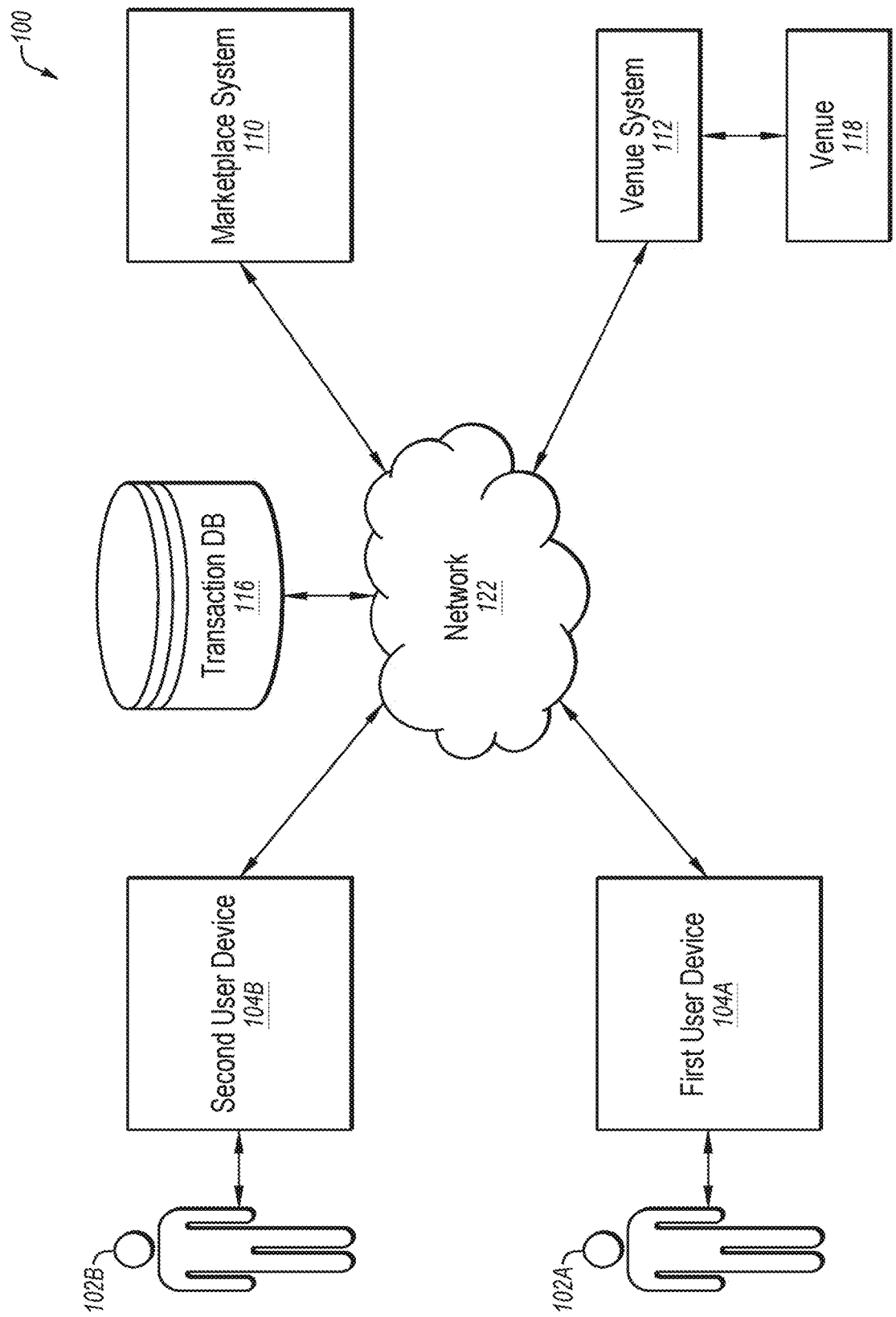
FIG. 1 illustrates an example operating environment in which an online ticket marketplace may be implemented.

FIG. 1 illustrates an example operating environment 100 in which an online ticket marketplace (hereinafter, "marketplace") may be implemented. In the operating environment 100, users 102A and 102B (generally, user 102 or users 102) may interact with user devices 104A and 104B (generally, user device 104 or user devices 104) to search for and/or obtain tickets, which may be listed on a site that is hosted and/or controlled by a marketplace system 110. The tickets may be for an event that occurs at a venue 118 or another venue (not shown). As the user 102 interacts with the marketplace system 110 via the user device 104, a multi-ticket package may be provided to the user device 104 from the marketplace system 110 via a network 122.

The operating environment 100 of FIG. 1 may include the marketplace system 110, the user devices 104, the network 122, a transaction database 116, and a venue system 112 that is associated with a venue 118. The marketplace system 110, the transaction database 116, the user devices 104, and the venue system 112 (collectively, environment components)

may communicate information and data via the network 122. For example, one or more of the environment components may communicate information and data related to user selections, filter criteria, recommendation data, preferences, ticket listings, and price recommendations. Each of the environment components is briefly described in the following paragraphs.

In some embodiments, one or more of the environment components may be configured to generate a customized multi-ticket package based on one or more user-selected filter criteria. In these and other embodiments, the one or more of the environment components may generate a package data object that includes the information for the multi-ticket package where each ticket in the multi-ticket package is a data object in the package data object. The generation of such a package data object may be described in further detail with respect to FIG. 2.

In some embodiments, a multi-ticket package may be based at least in part on user input. The user input may be received at the user device 104 and may be communicated to the marketplace system 110. The user input may include one or more filter criteria related to a multi-ticket package. The filter criteria may include one or more factors related to a seat, generally referred to as seat-based factors, including: price, price range, seat quality, seating section, location properties (e.g., venue, seat, zone, section, etc.), view (e.g., obstructed, elevated, normal), a characteristic of the seat (e.g., a general admission, a bench seat, a lawn seat, a box seat), delivery method of a particular ticket (e.g., will-call, deliver by mail, print), quantity (e.g., two tickets, three tickets, etc.), payment method (e.g., credit card, PayPal®, cash-on-delivery), seat features (e.g., access to VIP lounge, tail-gating access, food or drinks included, parking included, etc.), venue (e.g., all tickets at the venue 118 or multiple venues), event types, and any combination of the foregoing.

Additionally or alternatively, in some embodiments, the filter criteria may include one or more factors related to an event, generally referred to as event-based factors, including timing of the event (e.g., weekend vs. weekday, day of the week, afternoon or night, events on a holiday or a holiday season), context of the event (e.g., a sporting event with a rival, a visiting player (e.g., Tom Brady), a ranking of a player on a visiting team (e.g., top five point guards in the National Basketball Association (NBA)), a ranking of a visiting team, a ranking of a hosting team, post-season events (e.g., playoff games, championship games, etc.), a number of tickets for the multi-ticket package (e.g., maximum of three games, minimum of two games, all matching events in the month of May, all matching events between Christmas and New Year's Day, etc.), or any combination of the foregoing. The marketplace system 110 and/or other components in the environment may construct a multi-game package based on the user input and provide the multi-game package to the user.

For example, a user may select filter criteria of the next five home games for the New York Knicks where a visiting team is ranked in the top 15 teams in the NBA. As another example, a user may select filter criteria of all home games of the San Francisco 49ers except Thursday games. As an additional example, a user may select filter criteria for lower bowl tickets to the next four Los Angeles Kings home games when playing a team in their division. As another example, a user may select filter criteria of front three rows for opening and closing nights for any Broadway musicals at a particular venue. As an additional example, a user may select filter criteria of first twenty rows to all Ohio State football games, both home and away. As another example, the user may select criteria of events on particular days and in particular venues or locations. For example, the user may desire tickets at a particular venue, such as an opera house, for the first Friday of the next three months. In each of these examples, the marketplace system 110 and/or other components in the environment may construct a multi-game package that adheres to the input of the user and may provide the multi-game package to the user.

In some embodiments, the user may be provided an offer to purchase the multi-ticket package at a discounted price compared to purchasing the tickets individually. The price difference may be borne by a company hosting the marketplace system, the seller(s) of the tickets, the venue, or any combination thereof. In some embodiments, a seller of tickets on the marketplace may designate whether or not the tickets are available for purchase in a multi-ticket package, and what portion of the discounted price the seller would bear. In some embodiments, the discount may be on a per-ticket basis, or may be based on an entire package, or may be based on the size of a package. Additionally or alternatively, some discounts may be based on a number of tickets near each other being purchased. For example, a user may receive a first discount for purchasing tickets for six adjacent seats, and a second discount for purchasing six adjacent seats to five different games.

In some embodiments, the marketplace system 110 may be configured to generate multiple multi-ticket packages consistent with the filter criteria that may be presented to the user for selection among the multiple multi-ticket packages. For example, if a user has selected filter criteria of the next five home games for the New York Knicks where a visiting team is ranked in the top 15 teams in the NBA, the marketplace system 110 may generate a multi-ticket package with all tickets to each of the events in a first section, and may generate another multi-ticket package with all tickets to each of the events in a second section, and may generate another multi-ticket package with all tickets in a lower bowl, and may generate an additional multi-ticket package with all tickets in an upper bowl.

In some embodiments, the marketplace system 110 may be configured to generate instructions to display an interactive map of the venue 118 on the display of the user device 104. For example, the display may include a price associated with one or more of the sections upon selecting one or more filter criteria. In these and other embodiments, the price associated with each section may represent an average price across each of the tickets in the multi-ticket package that conforms to the filter criteria selected by the user. For example, if the multi-ticket package is represented as a package data object, each of the data objects may be analyzed or parsed to find the price for that data object and an average may be taken for the entire package data object. In some embodiments, a distinct package data object may be generated for each section, each row, or each of any other physically demarcated region of a venue. In these and other embodiments, a price may be displayed on the interactive map for multiple package data objects. Such a display may allow the user to select from multiple multi-ticket packages based on a variety of factors, for example, based on region or location and the filter criteria.

In some embodiments, a user may enter sufficient filter criteria to identify a single multi-ticket package consistent with the filter criteria. For example, if a user has selected a location within a threshold size in a venue (e.g., a section, or a set of rows), the marketplace system 110 may generate a single multi-ticket package to be presented to the user. In some embodiments, such a multi-ticket package may be presented to the user without generating a map of the venue.

In some embodiments, a user may select filter criteria until enough factors have been selected to construct a multi-ticket package. For example, if a user has selected filter criteria of the next five home games for the New York Knicks where a visiting team is ranked in the top 15 teams in the NBA, the marketplace system 110 may generate a multi-ticket package including one ticket to each of the corresponding events. Upon a selection of further filter criteria, such as selection of a zone or section, the multi-ticket package may be adjusted or refined to change the tickets of the multi-ticket package to remove tickets inconsistent with the filter criteria and to add tickets consistent with the filter criteria. As various additional filter criteria are selected, a display of one or more multi-ticket packages and/or potential multi-ticket packages may be adjusted based on the changing filter criteria. For example, if a user has selected a particular section of a venue, a multi-ticket package price may be displayed for each row, or for the section generally. In these and other embodiments, a user may select a feature to generate, complete, or otherwise compile the multi-ticket package such that the multi-ticket package may be presented to the user 102 on the user device 104.

In some embodiments, after being presented with a multi-ticket package based on the filter criteria, the user may be afforded an opportunity to add or remove one or more events of the multi-ticket package that the user also wants to attend or no longer desires to be part of the package. For example, if the user had selected filter criteria of the next five home games for the New York Knicks where a visiting team is ranked in the top 15 teams in the NBA, the multi-ticket package may include a game on a Sunday night where the user already had plans. The user may remove that ticket from the package, and optionally may add another game instead.

After being presented with the multi-ticket package, the user 102 may interact with the user device 104 to complete the transaction to purchase the multi-ticket package. For example, the user device 104 may communicate a transaction confirmation message to the marketplace system 110.

In some embodiments, after the user device 104 transmits a message to complete the transaction, the marketplace system 110 may confirm the availability of all of the tickets within the multi-ticket package. For example, the marketplace system may transmit a request to each of the entities offering the tickets of the multi-ticket package for sale to confirm that the tickets are still available. Upon receiving confirmation that the tickets are available, the marketplace system 110 may transmit a purchase confirmation to each of the entities offering the tickets for sale. The marketplace system 110 may then transmit the confirmation that the tickets were purchased to the user device 104.

In these and other embodiments, a single message may be transmitted to the marketplace system 110 to complete the purchase of all of the tickets in the multi-ticket package, rather than multiple different transactions, potentially with multiple different systems. Such an arrangement allows for the preservation of network bandwidth because fewer messages must be transmitted and fewer resources must be devoted to navigating to identify and purchase seats for each transaction. Furthermore, such an arrangement allows preservation of computing resources at the user device 104, as the marketplace system 110 may be configured to facilitate and/or complete the transactions between each of the entities selling tickets, even if that includes a primary seller and/or multiple secondary sellers, rather than the user device 104 being required to do so.

The network 122 may include a wired network, a wireless network, or any combination thereof. The network 122 may include any suitable configuration or configurations including a star configuration, token ring configuration, or other configurations. The network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols. In some embodiments, the network 122 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, and the like.

The user 102 may include an individual or an entity that may interface with the user device 104 to participate in a ticket transaction. Participation in the ticket transaction may include, for example, an offer or listing of a ticket for sale; searching for a ticket to an upcoming event, which may include input of one or more preferences; purchase of a ticket; requesting a suggested price for a ticket; entering filter criteria; or some combination thereof. For example, the user 102 may include an individual who wants to purchase multiple tickets for upcoming events that are scheduled to take place at the venue 118. The user 102 may also include an individual who wants to sell a ticket for the upcoming event.

In some embodiments, the users 102 may act as a seller entity and as a buyer entity. For instance, in a first transaction, a first user 102A may purchase a ticket from a second user 102B and in a second transaction; the first user 102A may sell a ticket to the second user 102B.

The user devices 104 may include a computing device that may include a processor, memory, and network communication capabilities. The user devices 104 may be configured for communication with one or more other environment components via the network 122. Some examples of the user devices 104 include a laptop computer, a desktop computer, a tablet computer, a smartphone, a personal digital assistant ("PDA"), a mobile e-mail device, a portable game player, smart wearable technology, or any other applicable electronic device capable of accessing the network 122. The user devices 104 may be configured to receive user interactions at the user devices 104 and to transmit one or more of those interactions over the network 122 to another environment component.

The venue 118 may include any forum in which events take place or are performed. Some examples of the venue 118 may include a stadium, an arena, a theatre, a parking lot, a fairground, and the like. The events of the multi-ticket package may include any type of experience, occasion, or affair, in which tickets are used for entry. Some examples of the event are sporting events, concerts, plays, movies, festivals, parking for other events, and the like. The venue 118 may be associated with the venue system 112.

The venue system 112 may include a hardware server that includes a processor, memory, and network communication capabilities. In the illustrated implementation, the venue system 112 is configured to communicate via the network 122 with the other environment components. The venue system 112 may track and generate event information that pertains to one or more events at the venue 118. For example, the event information may include prices of available tickets for an upcoming event, distances between locations reserved by tickets relative to a point of interest during specific events, prices at which tickets were sold for previous events, ticket availability for events, and event schedule information (e.g., time, date, participants, and the like). The event information may be communicated to the marketplace system 110 and/or the transaction database 116. In addition, one or more portions of the event information may be updated as tickets are sold or circumstances change for an event. Updated ticket information may be communicated to the transaction database 116 and/or the marketplace system 110. In some embodiments, the event information may be generated and/or stored by the marketplace system 110. Additionally or alternatively, the venue system 112 may be included in the marketplace system 110.

The transaction database 116 may include any storage device or storage devices capable of data storage in the operating environment 100. The transaction database 116 may store and maintain historical transaction information. The historical transaction information may include data and information related to previous ticket transactions performed in the operating environment 100 and/or at the venue 118.

The transaction database 116 may be accessible to the marketplace system 110 and/or the venue system 112. For instance, the venue system 112 may store event information in the transaction database 116. Additionally, the marketplace system 110 may access the historical transaction information from the transaction database 116 and/or store the historical transaction information at the transaction database 116. Although not explicitly shown in FIG. 1, the event information and/or the historical transaction information in the transaction database 116 may also originate at other sources. In the embodiment of FIG. 1, the transaction database 116 is depicted separate from the marketplace system 110. In other embodiments, the transaction database 116 may be included, at least partially, in the marketplace system 110.

In some embodiments, the transaction database 116 may store one or more listings of tickets. For example, the transaction database 116 may include a first entry corresponding to a first listing with a first set of attributes. The attributes of the listings may correspond to any characteristic of the listing, such as an event attribute identifying the event, a venue attribute identifying the venue, a region attribute identifying the region of the venue for the listing, a price attribute identifying a price of the listing, a source of the listing identifying which seller (including a primary seller or one or more secondary sellers) is the source of the listing, and any other attributes. In some embodiments, the attributes of a listing may correspond to one or more filter criteria such that entries in the transaction database 116 may be searched or sorted based on the attributes.

In some embodiments, one or more entries in the transaction database 116 may include common values for attributes. For example, a first entry and a second entry may have a common venue attribute, indicating that both listings are for the same venue, or a common row attribute, indicating that both listings are on the same row. For example, if a user were looking for three adjacent tickets to two events, the first group of three tickets for a first of the two events would have a common event attribute, venue attribute, region attribute, and row attribute with each other; and the second group of three tickets for a second of the two events would have a common event attribute, venue attribute, region attribute, and row attribute with each other. Additionally, the first group of three tickets and the second group of three tickets would have a different event attribute, but may have common attributes among the other attributes, depending on the filter criteria and/or other selections by the user.

The marketplace system 110 may include a hardware server that includes a processor, memory, and network communication capabilities. In the illustrated implementation, the marketplace system 110 is configured to communicate via the network 122 with the other environment components.

In some embodiments, the marketplace system 110 may be configured to host an online ticket marketplace. The online ticket marketplace may be configured to act as a broker between sellers and buyers for seats to a specific venue. For example, a seller may provide information about seats that the seller has at a football game. The online ticket marketplace may provide a listing for the specific seats on a user interface that allows buyers to locate and purchase the seats for the event at the venue. The seller may be a primary seller or a secondary seller of the seats.

In these and other embodiments, the marketplace system 110 may include web servers, application servers, messaging servers, API servers, databases, among other servers, databases, and processors, and other devices that may be networked together to perform the functions described in this disclosure. For example, some or all of the functions described in this disclosure by the marketplace system 110 may be performed by one or more devices, such as a processor, included in the marketplace system 110.

In some embodiments, in selecting tickets to be included in a multi-ticket package based on the filter criteria, the marketplace system 110 may select a ticket based on one or more evaluation criteria of the ticket. The marketplace system 110 may be configured to generate the evaluation criteria. In general, the evaluation criteria include quantitative metrics of a ticket and/or a location reserved by the ticket (e.g., a seat). The quantitative metrics may rate the ticket or the location with respect to the venue 118, with respect to one or more other tickets, with respect to one or more other seats, or some combination thereof. The evaluation criteria may be based on historical transaction information, which may be stored in a transaction database 116 (in FIG. 1 transaction DB 116). The evaluation criteria may additionally be based on information that pertains to the venue 118, information that pertains to an upcoming event, information regarding currently available tickets, or some combination thereof. In some embodiments, the evaluation criteria may include a quality score, a historical ticket value, a current ticket value, and a deal score. For example, if multiple tickets for the same event are consistent with the filter criteria, the marketplace system 110 may select a ticket with a better deal score based on the evaluation criteria of the multiple tickets. Additional details of the quality score, the historical ticket value, the current ticket value, and the deal score are provided elsewhere in this disclosure.

In some embodiments, the evaluation criteria may be generated when a ticket is first listed with the marketplace system 110, may be generated when a ticket is consistent with one or more filter criteria, or at some other time, such as during lulls in activity of the marketplace system 110. In some embodiments, the evaluation criteria may be used to sort or filter listings associated with the marketplace system 110, such as by being a selectable filter criteria.

The marketplace system 110 may also receive, from one or both of the user devices 104, one or more ticket listings. The ticket listings may be for one or more particular locations (e.g., seats) and may include prices for an upcoming event. The marketplace system 110 may also receive from one or both of the user devices 104 user input that may include filter criteria and/or preferences such as an indication of a seat quality preference and a price preference for an upcoming event.

The marketplace system 110 may calculate one or more evaluation criteria based on the historical transaction information, the event information, the ticket listings, or some combination thereof. In some embodiments, the evaluation criteria may include a quality score, a historical ticket value, a current ticket value, and a deal score. Each of these evaluation criteria is introduced in the following paragraphs using a seat as an example location that is reserved by a ticket. It may be appreciated with the benefit of this disclosure that although some features are described with respect to a seat, those features may be applicable to circumstances in which a ticket reserves another location such as a parking spot, a general admission area, entry into a venue, participation in an event, and the like.

The quality score may indicate a property of the seat that is reserved by a ticket. The quality score may be indicative of an experience of the user 102 when positioned (e.g., seated) in the seat that is reserved by the ticket. For example, the quality score may be based on a distance from a point of interest of the venue 118 to a seat that is reserved by the ticket. Additionally or alternatively, the quality score may be generated based on one or more other factors, some details of which are described elsewhere herein.

Ticket value is generally the quality of the seat that a buyer receives per unit price. For instance, better quality seats usually have higher prices and lower quality seats usually have lower prices. The ticket value normalizes relationships between the quality of the seats and the prices. In addition, the ticket value for a seat is relative to other seats in the venue 118. Ticket value is described in this disclosure as two quantities the historical ticket value and the current ticket value. The historical ticket value provides the historical context from which the current ticket value can be assessed. The assessment of current ticket values relative to the historical ticket values is included in the calculation of the deal score.

The historical ticket value may indicate a property of a seat relative to all other seats in the venue 118. The historical ticket value may be based on historical transaction information. The historical ticket value may be indicative of historical prices paid for tickets for the seat relative to historical prices paid for tickets for one or more of the other seats of the venue 118. For example, if a seat is on the front row of the venue 118, that seat is likely to have a higher historical ticket value than a seat on the twentieth row, as it likely has sold for a higher value in previous transactions for previous events than the seat on the twentieth row.

The current ticket value may indicate a property of a ticket that is currently available for an upcoming event and the seat that is reserved by the ticket. The current ticket value may be based on a price of the ticket relative to other available tickets for the upcoming event. For example, a ticket that is listed at ten dollars below all other tickets for an event at the venue 118 may have a high current ticket value, as an interested user may pay less money to attend the event.

The deal score may indicate a property of a ticket that is currently available for an upcoming event and the seat that is reserved by the ticket. The deal score may be based on the current ticket value and the historical ticket value. The deal score may be indicative of whether the ticket is overpriced or underpriced considering the current ticket value and the historical ticket value. For example, for a given ticket that is listed 10% below the historical ticket price for the seat, while every other ticket is listed for approximately 20% below the historical ticket prices for those seats, the given ticket may have a low deal score. As another example, for a given ticket that is listed 10% above the historical ticket price for the seat, while every other ticket is listed for approximately 20% above the historical ticket prices for those seats, the given ticket may have a high deal score.

In some embodiments, a deal score may be determined upon a listing being generated by a seller of a ticket. Additionally or alternatively, the deal score may be determined or updated upon a user viewing or navigating to the listing. Additionally or alternatively, the deal score may be determined or updated upon a user selecting filter criteria that includes the listings, or at some other time.

In some embodiments, the marketplace system 110 may rank calculated deal scores. For instance, the marketplace system 110 may determine whether a first deal score for a first listing is greater than a second deal score for a second listing. In these and other embodiments, the marketplace system 110 may user the ranking of the deal scores in the selection of tickets to be included in the multi-ticket package. For example, for each event identified by the filter criteria, the marketplace system 110 may rank the listings that are consistent with the filter criteria and select the ticket with the highest deal score. As an example, if a user had selected filter criteria identifying the next five home games for the New York Knicks where a visiting team is ranked in the top 15 teams in the NBA without selecting a particular zone, section, or other region of the venue, the marketplace system 110 may select the ticket with the highest deal score in the venue for each of those five games.

In the operating environment 100, memory in one or more of the environment components may be similar to memory 424 described with reference to FIG. 4, processors in one or more of the environment components may be similar to a processor 422 described with reference to FIG. 4, and network communication capabilities of one or more of the environment components may be provided by a communication device 426 described with reference to FIG. 4.

Modifications, additions, or omissions may be made to the operating environment 100 without departing from the scope of the present disclosure. Specifically, embodiments depicted in FIG. 1 include one or more user devices 104, one or more users 102, one or more venue systems 112, one or more venues 118, one or more marketplace systems 110, or some combination thereof.

Moreover, the separation of various components in the embodiments described herein is not meant to indicate that the separation occurs in all embodiments. It may be understood with the benefit of this disclosure that the described components may be integrated together in a single component or separated into multiple components. For example, in some embodiments the transaction database 116 may be included in the marketplace system 110.

Figure 2:
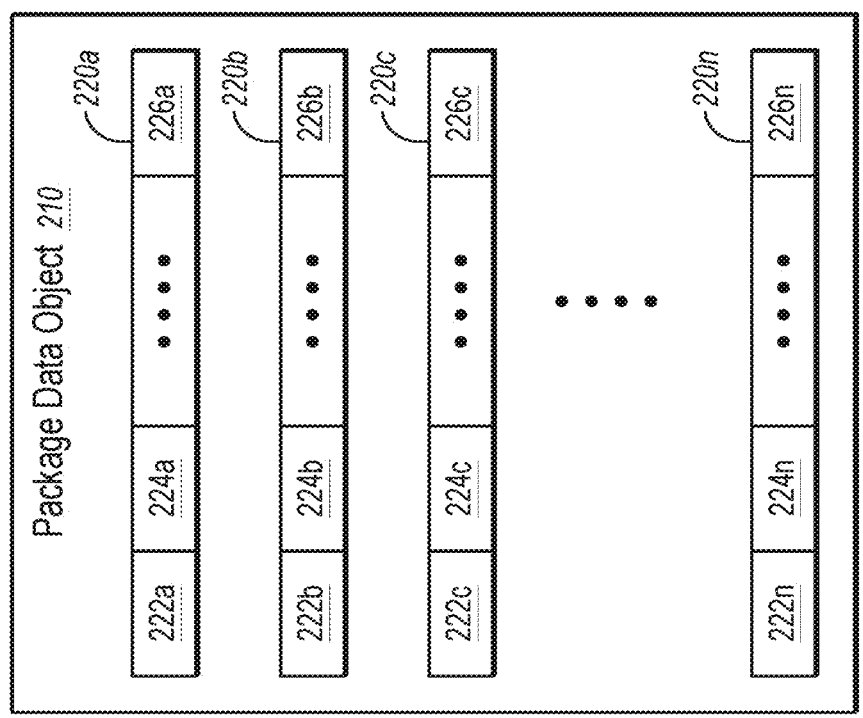
FIG. 2 illustrates an example package data object.

FIG. 2 illustrates a configuration of an example package data object 210. The package data object 210 may be arranged in accordance with at least one embodiment described in the present disclosure. The package data object 210 may be stored in a storage medium that may be part of a computing system that hosts an online ticket marketplace. For example, the storage medium may be part of the marketplace system 110 and/or the transaction DB 116 of FIG. 1. In these and other embodiments, the storage medium may be configured to store information about the package data object 210 that may include multiple subsidiary data objects 220a-220n (referred to collectively as data objects 220). In some embodiments, the package data object 210 may be generated by the marketplace system 110.

FIG. 2 illustrates a first data object 220a, a second data object 220b, a third data object 220c, and an nth data object 220n of the data objects 220. Each of the data objects 220 may include information for one seat of a multi-ticket package. In these and other embodiments, the data objects 220 may correspond to a particular set of filter criteria for a venue, such that the first data object 220a may correspond to a first ticket in a multi-ticket package for a first event that meets the filter criteria, the second data object 220b may correspond to a second ticket in the multi-ticket package for a second event that meets the filter criteria, proceeding along to the nth data object 220n that may correspond to an nth ticket in the multi-ticket package for an nth event that meets the filter criteria.

Each of the data objects 220 may include various data fields, such as the data fields 222, 224, and 226. As illustrated, the first data object 220a may include a first data field 222a, a second data field 224a, and a third data field 226a. The second data object 220b may include a first data field 222b, a second data field 224b, and a third data field 226b. The third data object 220c may include a first data field 222c, a second data field 224c, and a third data field 226c. The nth data object 220n may include a first data field 222n, a second data field 224n, and a third data field 226n.

The data fields 222 in the data objects 220 may include information such as location in the venue, such as a section, row, seat, region, etc. The data fields may include other information, such as a price and surrounding seats. Alternately or additionally, the data fields 222 may include a field that allows a data object 220 to be tagged with an origin of the seat that is included in the data object 220. Any other characteristics associated with a ticket may be included in the data fields, such as characteristics corresponding to one or more filter criteria identified in the present disclosure, discount amounts, a deal score, or other evaluation criteria. In some embodiments. The data fields 222 may include common values for attributes. For example, a first entry and a second entry may have a common venue attribute, indicating that both listings are for the same venue, or a common row attribute, indicating that both listings are located on the same row. In some embodiments, the data objects 220 may be sorted or filtered based on the values for the attributes.

In some embodiments, the package data object 210 may be constructed one data object 220 at a time, or multiple data objects 210 at a time. For example, if a user selected filter criteria of the next five home games for the New York Knicks where a visiting team is ranked in the top 15 teams in the NBA, a schedule of home games for the New York Knicks may be checked against a listing of rankings of NBA teams, such as a third party website with rankings of NBA teams, and the next five games may be identified. After identifying the events that meet the filter criteria, a ticket may be selected for the first event from tickets that meet the filter criteria for the first event, and that ticket may be added as the first data object 220a in the package data object 210. A second ticket may be selected for the second event, and that ticket may be added as the second data object 220b in the package data object 210. Such a selection and adding process may be repeated until the number of tickets identified by the filter criteria is met, or all events that meet the filter criteria have a ticket added. In some embodiments, the selection process may include retrieving entries associated with the tickets that meet the filter criteria from a transaction database. Additionally or alternatively, the selection process may include placing a hold on the tickets added to the package data object 210. The hold may be placed for a limited time or may be placed until a user generating the package data object 210 has consummated a purchase, closed a browser, canceled a transaction, deleted the package data object 210, and/or otherwise concluded their search for a multi-ticket package.

In some embodiments, the addition of data objects 220 to the package data object may occur in any order, including the addition of multiple data objects 220 at a time. For example, multiple parallel processes may process a list of events consistent with the filter criteria such that more than one data object 220 is added to the package data object 210 at a time. In some embodiments, a list of events consistent with the filter criteria may be processed in any order based on any number of factors, including date order (such as soonest to farthest in the future, or vice versa), price order (such as most expensive event to least expensive event, or vice versa), availability order (such as event with fewest available listings to event with most available listings, or vice versa), or others, or any combinations thereof.

In some embodiments, tickets from both a primary seller and a secondary seller may be included in the same multi-ticket package. A discussion of implementing a marketplace in which primary and secondary tickets may be included in the same transaction is described in U.S. application Ser. No. 15/017,115, the entirety of which is incorporated by reference. Additionally, determination of a deal score for a particular ticket is described in greater detail herein under the heading "Blending Tickets From Primary and Secondary Sellers." For example, for a multi-ticket package with five tickets, the first two tickets may be from a secondary seller, the third and fourth tickets may be from a primary seller, and the fifth ticket may be from another secondary seller. As another example, for a multi-ticket package to three events, a corresponding package data object 210 may include data entries 220 corresponding to the tickets. For example, the package data object 210 may include four data entries 220 for four tickets to the first event, including two tickets from a primary seller and two tickets from a secondary seller as indicated by an origin data field 222 of the data entries 220. The data entries 220 for the tickets to the second event may include four tickets, all from a primary seller as indicated by the origin data field 222. The data entries 220 for the tickets to the third event may include two tickets from a secondary seller as indicated by the origin data field 222. Upon a single request to purchase the multi-ticket package, based on the package data object 210, a computing system such as the marketplace server 110 of FIG. 1 may transmit a request to each of the systems indicated in the origin data fields 222 requesting confirmation of availability of the tickets. Upon receiving confirmation of the availability for all of the data objects 220 in the package data object 210 a request to purchase the tickets may be transmitted to each of the systems indicated in the origin data fields 222.

In some embodiments, a data field 222 indicating surrounding seats may be utilized in multi-ticket packages for multiple seats to multiple events such that multiple seats from multiple vendors may be identified as surrounding a first seat, despite not being listed by the same vendor. For example, a first listing for a seat from a primary seller may be identified as being adjacent a listing for two additional seats from a secondary seller based on the surrounding seats data field 222.

Selecting a ticket to add to a multi-ticket package may be based on any of a variety of factors. For example, one or more user preferences may be utilized in selecting a ticket. Such user preferences may include a seat quality preference and/or a price preference for an upcoming event. Additionally, such preferences may include any of the seat-based factors such as aisle vs. middle of row, preferred section, preferred proximity to concessions, preferred ticket features such as included parking, etc. In some embodiments, such preferences may be manually entered by a user. Additionally or alternatively, such preferences may be generated by tracking the interactions of a user with a user interface associated with an online ticket marketplace to determine the preferences. Such interactions may include user purchases, tickets viewed by the user, how long the tickets were viewed, and the like. The user preferences may be stored in a user profile that may be retrieved to facilitate the selecting of the tickets.

In some embodiments, interactions for multiple users may be tracked to generate typical preferences for all users or a particular subset of users of the online ticket marketplace in a generic user profile. For example, there may be a set of preferences for users purchasing a multi-ticket package instead of a single ticket. As another example, there may be a set of preferences that are typical for users from a particular region of a country or particular country.

In addition to or alternatively to the user preferences, the ticket selection may be based on a deal score of the ticket. Determination of a deal score for a ticket is described in U.S. patent application Ser. No. 15/167,875, the entirety of which is incorporated herein by reference. Additionally, determination of a deal score is described in greater detail herein under the heading "Determining a Deal Score for a Ticket Listing." In some embodiments, multiple tickets may meet the filter criteria for a given event, and the ticket with the best deal score may be selected to be added to the package data object 210. In some embodiments, the deal score may be based on one or more user preferences of the user or of a generic user. For example, a particular user may prefer a high quality seat over a low priced seat, and thus for the particular user, the deal score may be biased towards quality of the ticket. As another example, the preferences for a particular region or type of event (such as a generic profile) may indicate that price is more important than quality, and the deal score may be biased towards a lower priced seat.

For example, if a user selected filter criteria of the next five home games for the New York Knicks where a visiting team is ranked in the top 15 teams in the NBA, and the first event has been selected, multiple tickets may meet the filter criteria for the first event. A user profile of the user may be retrieved that indicates the user prefers high quality seats over price, prefers the middle of a row, and likes to be near concessions. The first ticket may be selected based on these preferences. After being selected, the first ticket may be appended as the next object in the package data object 210 (e.g., the first data object 220a in the package data object 210). Each successive ticket after the first ticket may also be added as another object in the package data object 210 until all five tickets have been added. Additionally or alternatively, as described above, the data objects 220 may be added in parallel or in any other order and based on any of a variety of factors. In this way, the selection and addition of the various tickets to meet the filter criteria may result in the creation of the package data object 210.

In some embodiments, the filter criteria may be based on a set of events at a given venue spanning multiple types of activities. For example, the filter criteria may select all events at the Staples Center in Los Angeles for a given date range may result in the inclusion of data objects 220 associated with an Los Angeles Lakers basketball game, Los Angeles Clippers basketball game, a concert, and a Los Angeles Kings hockey game in generating the package data object 210.

If a user removes a ticket from the multi-ticket package, the corresponding data object 220 may be removed from the package data object 210. Additionally or alternatively, if the user manually selects additional events to add to the multi-ticket package or additional seats to add to a current ticket in the multi-ticket package, a data entry 220 associated with the new ticket may be selected and added to the package data object 210.

In some embodiments, a package data object 210 may include data objects 220 that span multiple venues. For example, a package data object 210 may include ten data objects 220, seven of which have a common venue attribute and three of which have different venue attributes. For example, if a user had selected filter criteria for all games of an Ohio State Football season in the first twenty rows, including home and away games, but had removed two away games, the package data object 210 may include seven data objects 220 that have a common venue attribute indicating the event is at the Ohio Stadium, and may include one data object 220 with a venue attribute indicating the event is at Michigan Stadium, and another venue attribute indicating the event is at Spartan Stadium.

In some embodiments, one or more tickets may be purchased by another buyer in the marketplace before the multi-ticket package is purchased. In some embodiments, the data object 220 associated with purchased ticket may be removed from the package data object 210 and a data object 220 associated with another ticket may be automatically added to the package data object 210. For example, the data object 220 associated with the next best deal ticket for the event may be added to the package data object 210. The price may be changed up or down based on the price data field 222 of the newly added data object 220. Additionally or alternatively, the price may remain the same, or the price may only be lowered but not raised, even if the newly added ticket is more expensive than the ticket that was previously in the package data object 210.

Modifications, additions, or omissions may be made to the package data object 210 without departing from the scope of the present disclosure. For example, the package data object 210 may include data objects 220 with varying size and data fields. As another example, the package data object 210 may be compiled in a different order, such as the last event back to the first event, or the most expensive event to the least expensive event, etc.

Figure 3A:
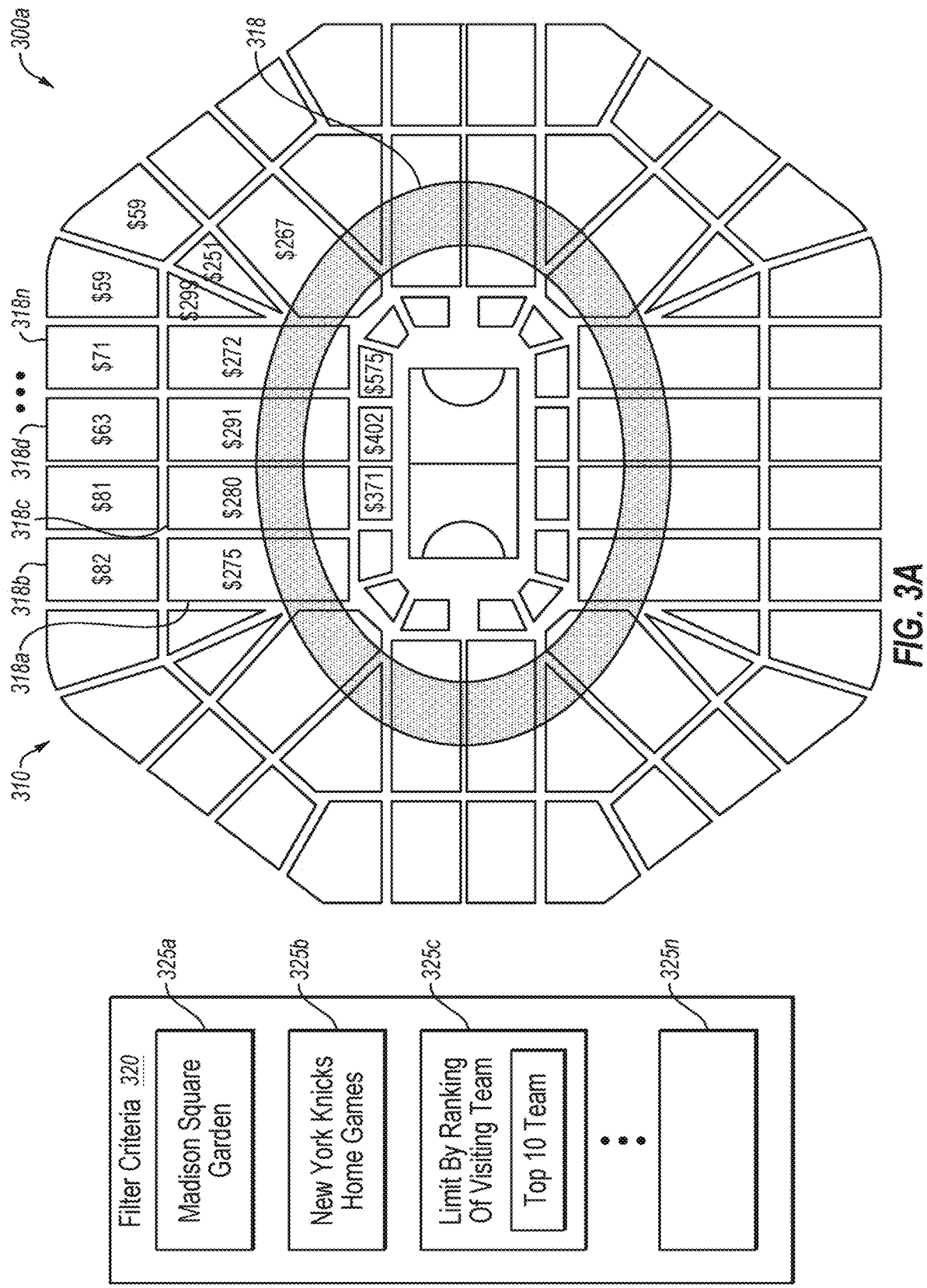
FIG. 3A illustrates an example user interface that may be implemented in the operating environment of FIG. 1.
Figure 3B:
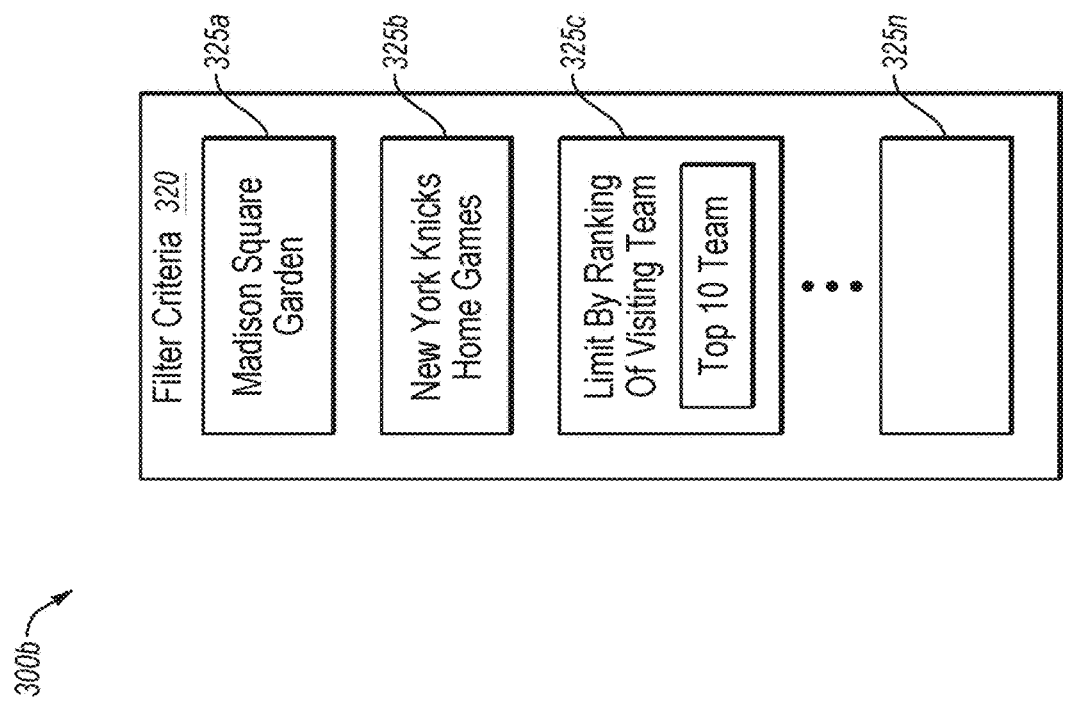
FIG. 3B illustrates another example user interface that may be implemented in the operating environment of FIG. 1.

FIGS. 3A and 3B illustrate various examples of user interfaces 300a and 300b, in accordance with one or more embodiments of the present disclosure. FIG. 3A illustrates a user interface 300a with an interactive map 310 of a venue at which a user may create a multi-ticket package. The user interface 300a also includes an interactive filter criteria region 320. FIG. 3B illustrates a user interface 300b with an interactive map of a section 311 from the user interface 300a. The user interface 300b may also include the interactive filter criteria region 320. In some embodiments, a user may interact with the user interface 300a of FIG. 3A, for example, by selecting the section 311 or by requesting further detail of the section 311. In response to such an interaction, the user may be presented with the user interface 300b of FIG. 3B.

As illustrated in FIG. 3A, the interactive map 310 of a venue may include a visual depiction of a number of sections at the venue, including a first section 315a, a second section 315b, a third section 315c, and an nth section 315n (referred to collectively as section(s) 315). In some embodiments, a price may be displayed in conjunction with each of the sections 315 of the interactive map 310. In some embodiments (such as that illustrated in FIG. 3A), an average price across each of the tickets in a multi-ticket package for that section 315 may be displayed on the interactive map 310. Additionally or alternatively, a total cost for a multi-ticket package may be displayed for each section 315 of the interactive map 310.

In addition to the sections 315 of the interactive visual map 310 representing the physical sections of the venue, the interactive visual map 310 may be divided into larger or smaller regions, such as a zone, an upper or lower bowl, a level, a row, etc. In some embodiments, a division on the interactive visual map 310 may be a conceptual division rather than a division based on the physical layout of the venue. For example, a region 318 may be designated within which each of the tickets of a multi-ticket package may fall, even though the region 318 may span multiple physical sections, zones, rows, etc.

The filter criteria region 320 may represent a region of the user interface 300a within which a user may designate one or more filter criteria to define the multi-ticket package. For example, the filter criteria region 320 may include a first filter aspect 325a for designating a first filter criteria, a second filter aspect 325b for designating a second filter criteria, a third filter aspect 325c for designating a third filter criteria, and an nth filter aspect 325n for designating an nth filter criteria (referred to collectively as filter aspect(s) 325). In some embodiments, one or more of the filter aspects 325 may be nested or progressive filter aspects, such that selecting a first value in one filter aspect may change the options to be selected in the next filter aspect. For example, a user may use the first filter aspect 325a to designate "Madison Square Garden" as the venue. That selection may change the next filter aspect such that the user may select "New York Knicks home games" as the next filter criteria. As another example, the user may select "Limit by ranking of visiting team" in one filter and then designate "top 10 teams."

In some embodiments, selection of a particular filter criteria in a filter aspect 325 may adjust the view of the interactive visual map 310. For example, if "lower bowl seats" is selected as a filter criteria, the interactive visual map 310 may be adjusted to only show or be more focused on the lower bowl of the venue.

In some embodiments, the interactive map 310 of the venue may include a feature to view further detail regarding one or more of the sections 315. For example, selection of such a feature may result in the user being presented with the user interface 300b of FIG. 3B in response to the selection of the feature. Additionally or alternatively, the interactive map 310 may have a feature to purchase the multi-ticket package based on the price displayed with a section 315.

As illustrated in FIG. 3B, the user interface 300b may include the section 315a from FIG. 3A. However, the section 315a may be divided into individual rows 330a-330k (referred to collectively as row(s) 330). The user interface 300b may display a price for each of the rows 330.

In some embodiments, if a particular row does not have a ticket available for each of the events that meet the filter criteria selected by the user, more than one of the rows 330 may be joined together as a single unit. For example, as illustrated in FIG. 3B, the row 330b includes two rows grouped together as designated by the hash-marks. In these and other embodiments, the price displayed may reflect a multi-ticket package where at least one of the tickets is from a different row.

In some embodiments, a price may be displayed in conjunction with one or more of the rows 330 of the interactive map of the section 315a. In some embodiments (such as that illustrated in FIG. 3B), an average price across each of the tickets in a multi-ticket package for that row 330 may be displayed on the interactive map. Additionally or alternatively, a total cost for a multi-ticket package may be displayed for one or more, or each of the rows 330 of the interactive map.

In some embodiments, the user interface 300b may include the filter criteria region 320. In this manner, a user may continue to refine a desired multi-ticket package while viewing the rows of a section rather than looking at an entire venue as depicted in the user interface 300a of FIG. 3A.

In some embodiments, after selecting a feature to purchase a multi-ticket package, a user may be presented with a visual display to review the multi-ticket package. In these and other embodiments, a visual map of the venue and/or a portion of the venue may be presented to the user with a visual indicator for one or more of the tickets in the multi-ticket package. For example, the location of each seat may be displayed in a different color with a date displayed near the seat indicating which seat is for which event in the multi-ticket package. As another example, the display of the venue may be in one color and the location of one or more of the seats may be indicated by an icon or feature in a different color than the color of the venue. In some embodiments, such a review display may include one or more features to remove and/or add one or more of the tickets in the multi-ticket package.

In some embodiments, a multi-ticket package may include tickets from multiple venues, such as a multi-ticket package for all of the games (including home and away games) of a college football team. In these and other embodiments, the map of the venue may be genericized to a display consistent with all venues included in the multi-ticket package. For example, most venues include seats surrounding a central activity, and may include tickets on the floor of the event. For example, a football stadium may show the football field and seats surrounding the tickets, with indicators of the location of the seats in the multi-ticket package, such as a colored region around the first 20 rows, or the section near the fifty yard line, or one of the end zones, etc.

Modifications, additions, or omissions may be made to the user interfaces of FIGS. 3A and 3B without departing from the scope of the present disclosure. For example, the user interfaces may include more or fewer components than those illustrated in the present figures. As an additional example, additional fields or features may be included in the user interfaces.

Figure 4:
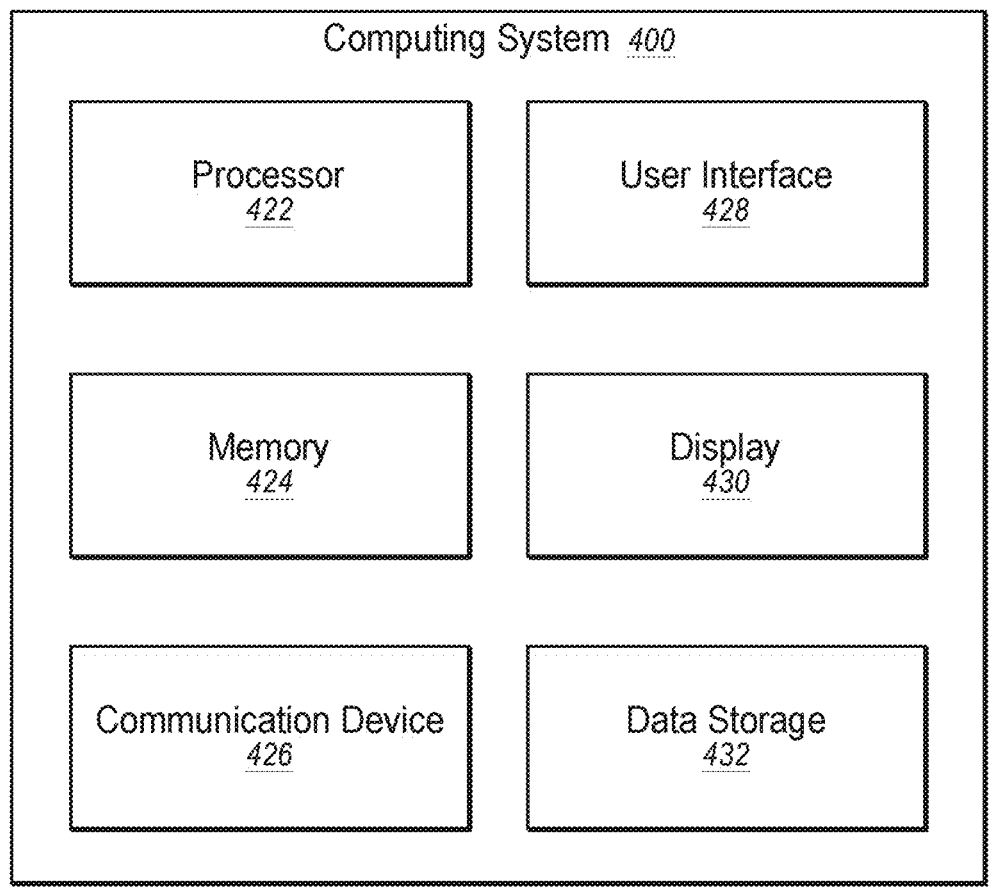
FIG. 4 illustrates an example computing system to generate a package data object.

FIG. 4 illustrates an example computing system 400 that may be used in a system to generate a package data object. The computing system 400 may be arranged in accordance with at least one embodiment described in the present disclosure. The computing system 400 may be an example of the user device 104, the marketplace system 110, and/or the venue system 112.

The computing system 400 may include a processor 422, a memory 424, a communication device 426, a user interface 428, a display 430; and a data storage 432.

In general, the processor 422 may include any suitable special-purpose or general-purpose computer, computing entity, or processing device including various computer hardware or software modules and may be configured to execute instructions stored on any applicable computer-readable storage media. For example, the processor 422 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, it is understood that the processor 422 may include any number of processors configured to perform individually or collectively any number of operations described herein. Additionally, one or more of the processors may be present on one or more different electronic devices, such as different servers. In some embodiments, the processor 422 may interpret and/or execute program instructions and/or process data stored in the memory 424. In some embodiments, the processor 422 may fetch program instructions from the data storage 432 and load the instructions in the memory 424. After the instructions are loaded into memory 424, the processor 422 may execute the program instructions to perform operations or methods described in this disclosure. For example, the processor 422 may receive instructions, load the instructions into the memory 424, and execute the instructions to perform the operations described in this disclosure.

The memory 424 and/or data storage 432 may include computer-readable storage media for carrying or having computer-executable instructions or data structures stored thereon. Such computer-readable storage media may be any available media that may be accessed by a general-purpose or special-purpose computer, such as the processor 422. By way of example, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 422 to perform a certain operation or group of operations.

The communication device 426 may include any component, device, system, or combination thereof that is configured to transmit or receive information over a network. In some embodiments, the communication device 426 may communicate with other devices at other locations, the same location, or even other components within the same system. For example, the communication device 426 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication device 426 may permit data to be exchanged with a network and/or any other devices or systems described in the present disclosure.

The user interface 428 may include any component, device, system, or combination thereof that is configured to provide input from a user to the computing system 400. For example, the user interface 428 may include a mouse, a track pad, a touch screen, a keyboard, or any other device that may interface with the computing system 400 to provide user input to the computing system 400. The display 430 may be any device configured to display or present information to a user.

Modifications, additions, or omissions may be made to the computing system 400 without departing from the scope of the present disclosure. For example, the computing system 400 may include other devices or multiple of the devices discussed. Alternately or additionally, the computing system 400 may not include some of the devices illustrated in FIG. 4.

Figure 5A:
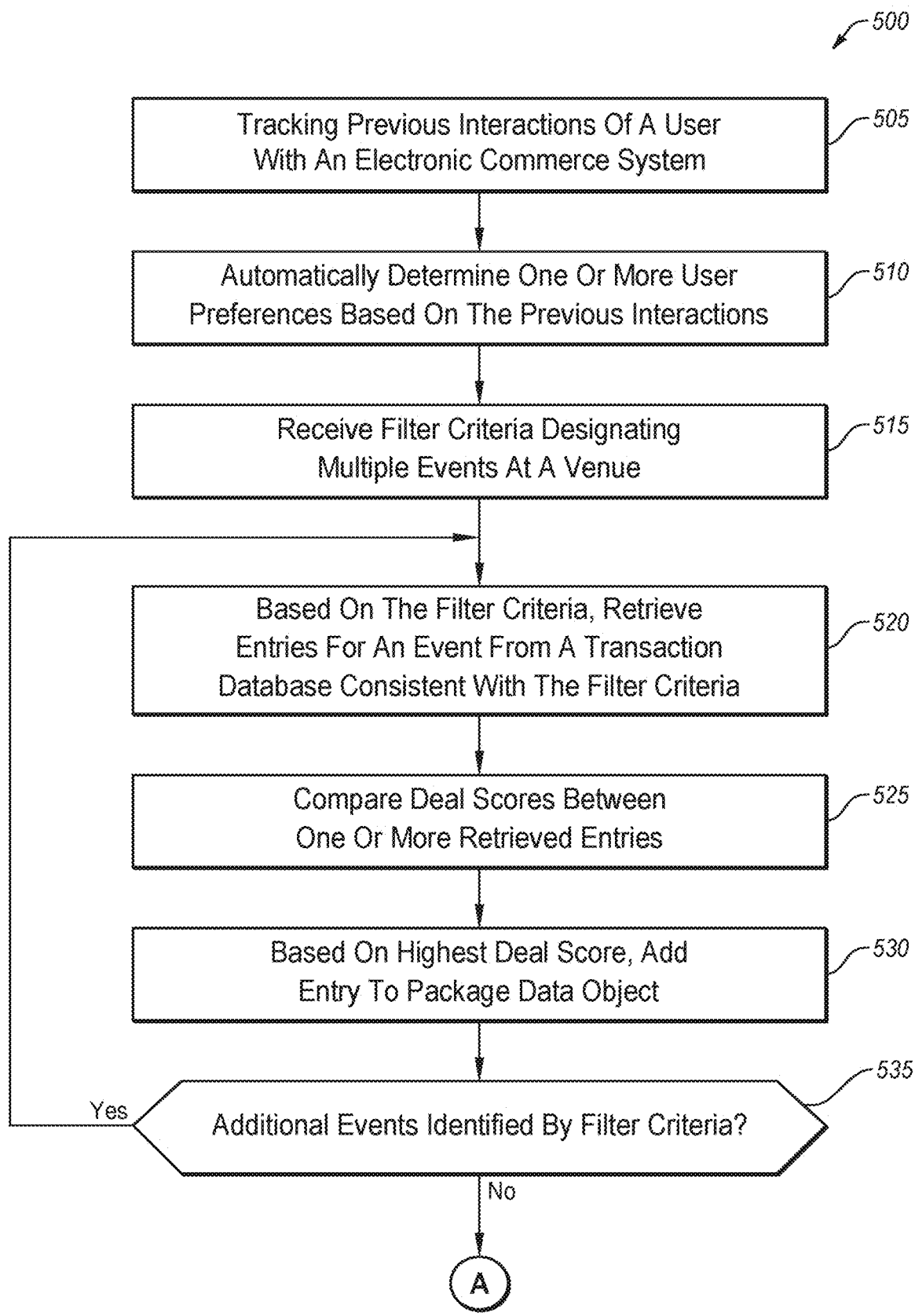
FIGS. 5A and 5B illustrate an example method to generate a package data object.
Figure 5B:
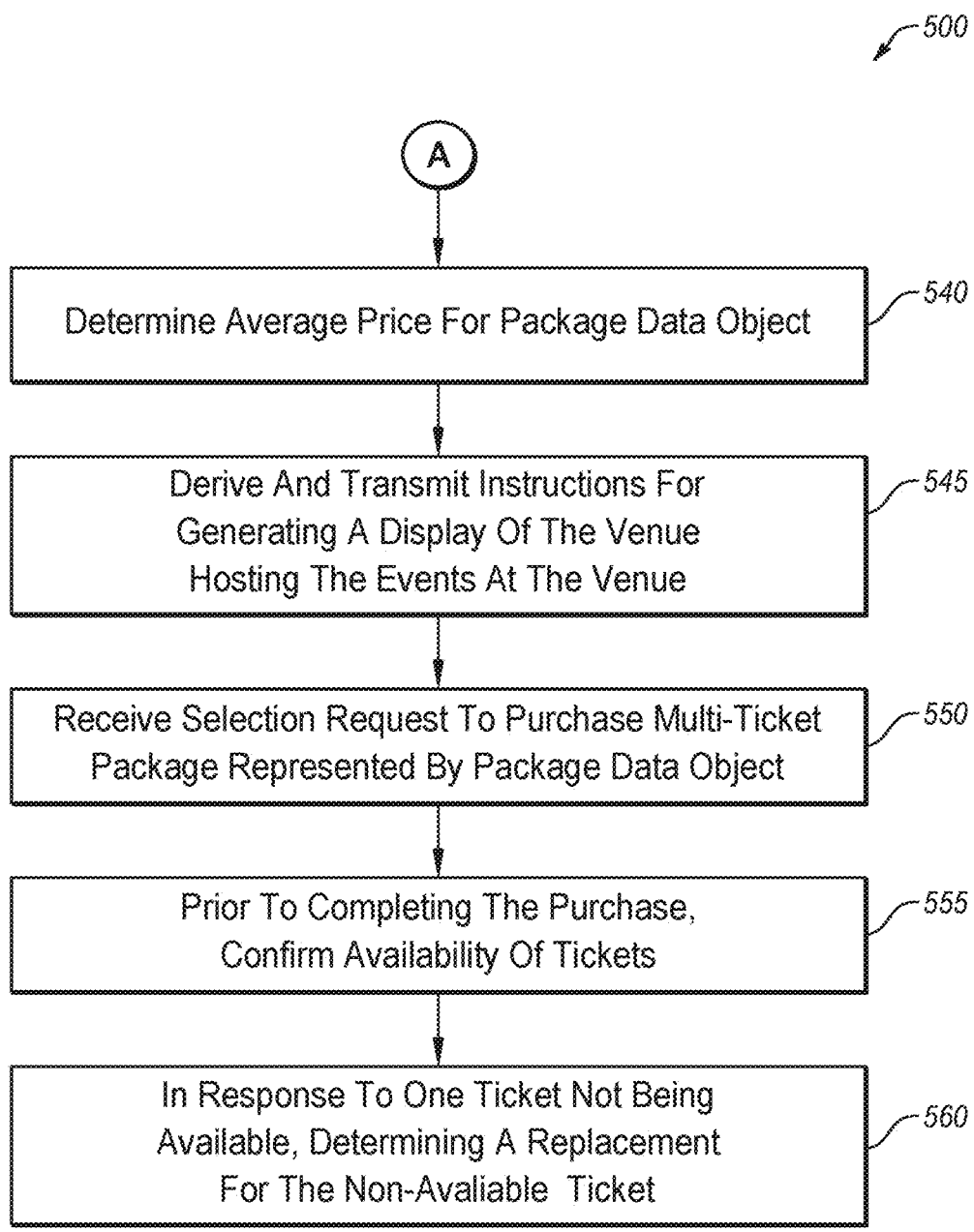

FIGS. 5A and 5B illustrate a flowchart of an example method 500 for generating a package data object, in accordance with one or more embodiments of the present disclosure. The method 500 may be performed in an operating system such as the operating system 100 of FIG. 1. Additionally or alternatively, the method 500 may be performed by the marketplace system 112 and/or the user devices 104 of FIG. 1.

With reference to FIG. 5A, at block 505, previous interactions of a user with an electronic commerce system (such as the marketplace system 110) may be tracked. For example, a user may interact with a user device (such as the user 102 interacting with the user device 104 of FIG. 1) to send requests and receive information from the electronic commerce system. Such interactions may include browsing for listings such as tickets for sale, making purchases based on the listings, searching for listings, etc.

At block 510, one or more user preferences may be automatically determined based on the previous interactions. For example, if a user purchases seats in a particular section on three separate transactions, it may be determined that it is a preference of that user to buy seats in the particular section. As another example, if a user buys aisle seats multiple times when seats are available in the middle of the row, it may be determined that it is a preference of that user for aisle seats. In these and other embodiments, the user may additionally or alternatively manually enter one or more preferences.

At block 515, filter criteria designating multiple events at a venue may be received. For example a user may input one or more filter criteria at a user device and those filter criteria may be transmitted to a marketplace system. The filter criteria may identify one or more characteristics of seats to be included in a multi-ticket package. For example, the filter criteria may identify a first event and a second event. In some embodiments, the filter criteria may identify a particular region of the venue for which seats are desired.

At block 520, based on the filter criteria, one or more entries from an electronic database may be retrieved. For example, the marketplace system may retrieve entries consistent with the filter criteria from a transaction database (such as the transaction DB 116 of FIG. 1) for a first event. In some embodiments, the marketplace system may retrieve all listings for the event consistent with the filter criteria. In some embodiments, the retrieved entries may be sorted by one or more data fields of the entries, including, for example, location (such as region, zone, section, row, etc.), price, deal score, or any other attribute as described in the present disclosure. The retrieved entries may include a first entry and a second entry associated with listings for tickets to the first event consistent with the filter criteria. The first entry and the second entry may include a common value for the event attribute (indicating both listings are for tickets to the first event), the venue attribute (indicating both listings are for tickets in the same venue), and region attribute (indicating both listings are for tickets in the same region of the venue).

At block 525, a comparison may be made between the first entry and the second entry to determine which of them has a greater deal score. For example, the entries associated with listings retrieved from the block 520 for the first event, including the first and the second entries, may be sorted according to deal score and the entry with the highest deal score may be selected as having a highest deal score.

At block 530, based on the first entry having a greater deal score, the first entry may be added to a package data object. For example, the marketplace system may add the first entry as a data object to the package data object as described above with reference to FIG. 2.

At block 535, a determination may be made as to whether there are additional events identified by the filter criteria. If there are additional events, the method 500 may proceed back to the block 520 until a data object has been added to the package data object for each event identified by the filter criteria. If there are no additional events, the method 500 may proceed to the block 540. In some embodiments the method 500 may include the generation of multiple package data objects as a preliminary step, where each of the multiple package data objects is consistent with the present filter criteria. For example, a first package data object may be generated for each section of the venue that is consistent with the filter criteria selected by the user. In some embodiments, the multiple package data objects may be generated based on physical regions within the venue. Additionally or alternatively, while illustrated as an iterative process, the various data objects may be added to the package data objects in any order, or in parallel with multiple data objects being added at the same time.

With reference to FIG. 5B, at block 540, an average price for each of the package data objects may be determined. For example, for each data object within the package data object, a price data field of the data object may be retrieved and numerically averaged. For example, if a package data object had four tickets, with price attributes of $40, $50, $50, and $40, the average price may be ($40+$50+$50+$40)/4=$45.

At block 545, instructions may be transmitted to generate a display of the venue hosting the events identified by the filter criteria. For example, a marketplace system may transmit instructions to a user device to generate a display of the venue hosting the first and second events. For example, the display may include a user interface with an interactive display of a map of the venue, with the average prices derived at block 540 displayed proximate the physical regions of the venue associated with the package data objects. For example, if a display included a section as one of the physical regions with a corresponding package data object, the display may include the average price for the package data object displayed proximate the section.

At block 550, a selection request may be received to purchase a multi-ticket package represented by a package data object. For example, a user device may receive input to purchase a multi-ticket package including first and second tickets and the user device may transmit a single purchase request to the marketplace system.

At block 555, prior to completing the purchase, the availability of the tickets in the package data object may be confirmed. For example, the marketplace system may verify that both the first and the second ticket are available. In some embodiments, confirming availability may include contacting another computing system, such as the venue system 112 of FIG. 1 or a computing system of a secondary seller to confirm that the first ticket and/or the second ticket are still available. In these and other embodiments, each data object in the package data object may undergo a confirmation of availability.

At block 560, in response to one or more tickets not being available, replacement ticket may be determined for the tickets. For example, the marketplace system may receive a communication from the venue system in response to the communication described in block 555 that the first ticket is no longer available. In response, the marketplace system may remove the data object associated with the first ticket from the package data object. Additionally or alternatively, the marketplace system may determine the listing with the next highest deal score that meets the filter criteria for the first event. In some embodiments, such a determination may include determining a deal score for another ticket and a deal score for the replacement ticket, and selecting the replacement ticket based on the replacement ticket having the higher deal score. Additionally or alternatively, such a determination may include retrieving a deal score or a list of deal scores for listings and selecting the highest deal score. For example, the marketplace system may retrieve or recall the entries for the event from the transaction database that are consistent with the filter criteria, and may sort the data objects based on the deal score data field. Based on the sorting, the data object with the highest deal score may be selected. A data object associated with the replacement ticket may be added to the package data object in place of the data object of the first ticket.

Modifications, additions, or omissions may be made to the method 500 without departing from the scope of the present disclosure. For example, the operations performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

For example, a deal score may be based off of a variety of factors, including historical transaction information, quality score, etc., and each of those factors may have a particular process or algorithm by which they are determined. As another example, the method 500 is described as occurring for a first ticket and a second ticket, but a multi-ticket package represented by the package data object may include any number of tickets from any number of sellers.

Determining a Deal Score for a Ticket Listing

One or more embodiments of the present disclosure may use a deal score when generating a multi-ticket package, for example, when determining which of two tickets should be added as a data object to a package data object representing the multi-ticket package. A deal score may be based on a variety of factors, including quality score, historical value, and a comparison of other tickets in an electronic database of tickets available for sale.

Historical value may be derived by consideration of historical transaction information. For example, in previous transactions, a seller entity may exchange one or more tickets with a buyer entity for an event at a venue (e.g., the venue 118 of FIG. 1). The seller entity and the buyer entity may be a user such as one of the users 102 of FIG. 1. The previous transactions may produce and/or result in historical transaction information and/or event information. The historical transaction information and/or event information may include a price exchanged for the tickets, other tickets on sale when the tickets were exchanged and prices for the other tickets, information about the venue in which the event occurred, other transaction information, or some combination thereof.

The historical transaction information and/or event information may be stored in a transaction database (such as the transaction database 116 of FIG. 1). The historical transaction information and/or event information may be communicated to or accessed by a marketplace system (such as the marketplace system 110 of FIG. 1).

In some embodiments, a computer system (such as the marketplace system 110 of FIG. 1) may be configured to calculate a quality score for one or more locations in the venue. For example, a quality score may be calculated for one or more or all of the seats in the venue with the venue in one or more particular configurations. In other example embodiments, a quality score may be calculated for one or more parking spaces, one or more portions of a general admission section of the venue, and one or more sections of a standing area of the venue.

A quality score may be indicative of an experience of a user (e.g., one or both of the users 102 of FIG. 1) positioned in the location during events. For example, a higher quality score calculated for a first location may indicate that the user may be able to see, hear, or otherwise be exposed to a point of interest of the venue better than a second location with a relatively lower quality score.

The quality score for a location may be calculated based on the historical transaction information, the event information, predetermined quality metrics, or some combination thereof. In some embodiments, the quality score may be calculated based on the average purchase price of tickets for each location. Generally, higher quality seats will have higher average purchase prices. Similarly, the quality score of the seats may be determined based on the average asking/listing price.

Additionally or alternatively, the quality score for a location may be based on distance information, such as a distance from the venue and/or a point of interest of the venue (e.g. distance from home plate, first plate, foul post, fifty yard line, center court, goal, concert stage, theatre stage, and/or the like).

In some examples, geolocators may be used to determine the distance. For example, user devices (e.g., the user devices 104 of FIG. 1) from attendees who have confirmed purchases or electronic ticket purchases may provide geolocations for a location such as a seat. The marketplace system may then determine the distance of the location from the provided geolocation and another geolocation for the venue, such as home plate. Other considerations may include, angle of view from the seat, distance to concession stands, exclusive access to certain areas of the venue, whether the seats are in a VIP room or a club room, and/or the like.

In some embodiments, the quality score may have a particular quality scores for all of the seats in a venue pre-set by an operator of the marketplace system. The quality scores may rank the quality of each seat.

In some embodiments a computing system (such as the marketplace system 110 of FIG. 1) may be configured to calculate a historical ticket value and/or a current ticket value for one or more locations in the venue. Both the historical ticket value and the current ticket value may provide information of the value of a location in the venue relative to some or all other locations in the venue. The value is generally an indication of the quality of a location relative to its price. The historical ticket value may include a value (e.g., quality per price) assessment of a seat based primarily on the previous transactions for the seat.

In some embodiments, the historical ticket value may be calculated to represent an upgrade value from a less-expensive available location. For example, the historical ticket value may be calculated for a particular seat by relating a ticket purchased for the particular seat to other tickets that were less-expensive and concurrently for sale. The historical ticket value may accordingly provide information regarding a price for the particular seat versus a purchase of a worse seat (e.g., a downgrade).

In these and other embodiments, the historical ticket value may be calculated for a seat according to a downgrade value expression:

$$MDV_i = \sum \frac{\text{Purchased seat price} - \text{cheaper seat price}}{\text{Number of instances}}.$$

In the downgrade value expression, the parameter i represents an indexing variable for the seat in the venue. The parameter $MDV_i$ represents the monetary downgrade value for a particular seat that is indexed by the indexing variable i. The parameter 'Purchased seat price' represents a price at which the particular seat sold. The parameter 'cheaper seat price' represents asking/listing prices of another seat that was available at the time the particular seat was purchased at the purchased seat price. The parameter 'Number of instances' represents a number of times the particular seat was purchased while the other seat was available.

The historical ticket value may be based on the historical transaction information and/or the event information. For example, the historical transaction information may include one or more of the parameters 'Number of instances', 'cheaper seat price', and 'Purchased seat price'. The historical ticket value may accordingly represent an average price to upgrade to the particular seat from less-expensive seats over numerous sales. The historical ticket value may be calculated for each location or seat in a venue.

Additionally or alternatively, the historical ticket value may be calculated to represent a downgrade value from a more-expensive available location. For instance, the historical ticket value may be calculated for a particular seat by relating a ticket purchased for the particular seat to other tickets that were more-expensive and concurrently for sale. The historical ticket value may accordingly provide information regarding a price for the particular seat versus a purchase of a better seat (e.g., an upgrade).

In these and other embodiments, the historical ticket value may be calculated for a seat according to an upgrade value expression:

$$MUV_i = \sum \frac{\text{Purchased seat price} - \text{more\_expensive seat price}}{\text{Number of instances}}.$$

In the upgrade value expression, the parameters i, 'Purchased seat price', and 'number of instances' are as described above. The parameter $MUV_i$ represents the monetary upgrade value for a particular seat that is indexed by the indexing variable i. The parameter 'more-expensive seat price' represents asking/listing prices of another seat that was available at the time the particular seat was purchased at the purchased seat price. Similar to the downgrade value expression described above, the historical ticket value may be based on the historical transaction information and/or the event information. For example, the historical transaction information may include one or more of the parameters 'Number of instances', 'more-expensive seat price', and 'Purchased seat price'. The historical ticket value may accordingly represent an average price to downgrade to the particular seat from more-expensive seats over numerous sales.

In some embodiments, in the upgrade value expression and/or the downgrade value expression, before price differences over numerous sales are averaged, the prices may be altered to reflect normalized values, which may partially compensate for differences in the value of the event itself. For instance, one or more of the 'cheaper seat price', the 'more-expensive seat price', and the 'Purchased seat price' may be divided by an average ticket price for an event.

Additionally or alternatively, the upgrade value expression and/or the downgrade value expression may be based on percentages or percentage differences. For example, the downgrade value expression may replace (Purchased seat price−cheaper Seat Price) in the above expression with a quotient of (Purchased seat price−cheaper seat price) to (cheaper seat price).

In some embodiments, multiple events at the venue may be used to calculate the historical ticket value. The historical ticket value module may use similar events to calculate the historical ticket value. For example, if a concert and a basketball game were played at the venue, the ticket sales for the concert might not be used for establishing the historical ticket values for the basketball game. The system may match certain information about the events to tailor the valuations to the particular event. For example, the historical ticket value module may look for matching teams, players, game time, time of year, time of day, and/or the like. Although the above example uses the average, other statistical estimation methods may be used, such as the median, mode, or other combinational methods.

In some embodiments, a current ticket value may be determined for a particular ticket. The current ticket value may provide a value (e.g., a quality per price) of a location in the venue relative to one or more other locations in the venue. The current ticket value may be based on a ticket price included in the ticket listing and prices of other seats that are currently available, which may be included in the event information.

In some embodiments, the current ticket value may be calculated to represent a downgrade value from a more-expensive available location to the location represented in the ticket listing. For instance, the current ticket value may be calculated for a particular seat by relating a ticket price in the ticket listing to other tickets that are more-expensive. The other tickets may be concurrently for sale for the event or may be previously purchased, but for the event. The current ticket value may accordingly provide information regarding a price for the particular seat in the ticket listing versus a purchase of a better seat (e.g., an upgrade).

In some embodiments, the current ticket value may be calculated to represent an upgrade value from a less-expensive available location to the location represented in the ticket listing. For instance, the current ticket value may be calculated for a particular seat by relating a ticket price for the particular seat to other tickets that are less-expensive. Again, the other tickets may be concurrently for sale for the event or may be previously purchased, but for the event. The current ticket value may accordingly provide information regarding a price for the particular seat versus a purchase of a worse seat (e.g., a downgrade).

The current ticket value may include calculation of an average price difference between the price from the ticket listing and prices of the other tickets. The average price difference may be calculated by subtracting one seat price from another seat price. Additionally or alternatively, in some embodiments, the average price difference may be represented as a percentage increase or decrease from one or more of the other seats. For example, a seat that is 50 dollars is 100% more expensive than a seat that is 25 dollars. Additionally or alternatively, in some embodiments, the price differences may be normalized compared to the historic ticket value for the location.

In some embodiments, a computer system (such as the marketplace system 110 of FIG. 1) may calculate a deal score for one or more locations in the venue. The deal score may be calculated for some or all of the tickets for sale for an upcoming event at the venue. In some examples, the deal score may represent how much overpriced or underpriced a ticket for the location is in relation to other available locations. The deal score may be calculated based on the current ticket value, the historical ticket value, the quality score, the ticket listing, or some combination thereof. In some embodiments, the deal score may be calculated by comparing a calculated historical ticket value of a seat that is reserved by a ticket with a current ticket value.

For example, a first seat may be for sale for $50 and a second seat may be for sale for $25. The current ticket value for the first seat in relation to the second seat may be represented by a percentage as 100%. However, based on the historical ticket values the relationship between a price of the first seat and a price of the second seat has been 80% (e.g., the first seat price is $45 when the second seat price is $25). The deal score may reflect that the price of $50 for the first seat is overpriced by 20%.

In some embodiments, the deal score may be calculated for a first seat in relation to some or all other locations in the venue or in relation to some or all other locations that are available for the upcoming event. In some embodiments, the deal scores for the first seat relative to the other locations may be averaged. The average deal score may be a final deal score or the deal score for the location.

For example, there may be four seats available at an upcoming event. The first seat and the second seat are described above with a first deal score with a 20% (+20). The (+/−) indicators may indicate whether the score is an overpriced (+) or underpriced (−). The first seat may be overpriced by 15% (+15%) in relation to a third seat and underpriced by 10% (−10) to a fourth seat. The underpriced or overpriced seat relationships may then be averaged (e.g., ((+20)+(+15)+(−10))/3=(+8.33)).

In some embodiments, the deal score may be calculated by having every seat available for sale compared to every other seat available for sale at a venue to calculate an averaged deal score for each seat (e.g. an average of how much a seat is under or overvalued compared to every other seat).

In some embodiments, the price in the ticket listing may be compared to other seats for sale within the same section, within the seating area, and/or comparable sections instead of every other location. In some embodiments, the price in the ticket listing may be compared to other seats for sale with similar equal quality scores and/or to other locations that include quality scores within a particular quality score range.

Figure 6:
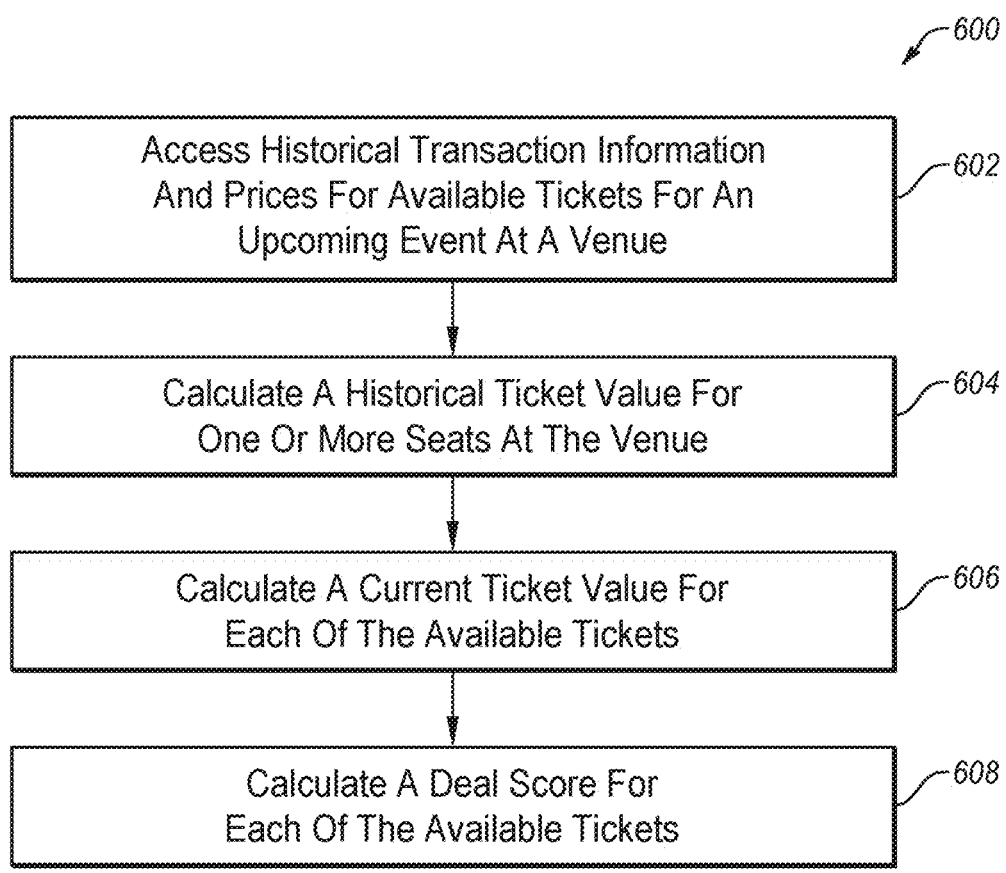
FIG. 6 illustrates an example method to determine a deal score.

As illustrated below, FIGS. 6 and 7 illustrate two examples of generating a deal score. For example, as described above, a deal score may be generated for one or more listings such that a deal score may be included as an attribute of a data object or an entry in a transaction database, or a deal score may be generated for the comparison of one or more listings. In some embodiments, the generated deal scores may be used to select listings for incorporation into multi-ticket packages.

FIG. 6 depicts a flow chart of an example method 600 of ticket assessment in an online ticket marketplace. The method 600 may be performed in an operating system such as the operating system 100 of FIG. 1. In some embodiments, the method 600 may be performed before or during compilation of a multi-ticket package based on a request from a user.

The method 600 may begin at block 602 in which historical transaction information and prices for one or more available tickets for an upcoming event at the venue may be accessed. The historical transaction information may pertain to previous transactions for events at a venue from a transaction database. The historical transaction information may include a type of event, an event time, an event date, event participant, event importance, and a venue configuration. In some embodiments, a marketplace system such as the marketplace system 110 of FIG. 1 may access the historical transaction information.

At block 604, a historical ticket value may be calculated for one or more seats at the venue. The historical ticket value may be based on a price at which a particular seat sold relative to asking/listing prices for tickets for other seats that were available at the time the particular seat was purchased and a number of times the particular seat was purchased while the other seat was available. In some embodiments, calculating the historical ticket value for the one or more seats may include calculation of a monetary upgrade value of each of the seats according to an upgrade value expression described elsewhere in this disclosure. In some embodiments, the historical ticket value may be calculated for all seats in the venue, or for all seats in the venue with a listing, or for a particular seat in the venue. A marketplace system such as the marketplace system 110 of FIG. 1 may calculate the historical ticket value.

At block 606, a current ticket value may be calculated for each of the available tickets. The current ticket value may be based on an average price difference between the price of the available ticket and prices of other available tickets.

At block 608, a deal score may be calculated for each of the available tickets. The deal scores may be indicative of whether the available ticket is overpriced or underpriced. In some embodiments, the deal score may be based on a comparison between the current ticket value for the available ticket and the historical ticket value for the available ticket. In some embodiments, the deal score includes an averaged deal score that is calculated by averaging individual deal scores computed for the available ticket relative to each of the other available tickets.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

For example, a quality score may be calculated. The quality score may be calculated for each of the seats. The quality scores may be indicative of an experience of a user positioned in the seat during events. In some embodiments, the quality score may be calculated based on one or both of an average purchase price of each of the plurality of seats and a distance of a point of interest at the venue to the associated seat location.

Figure 7A:
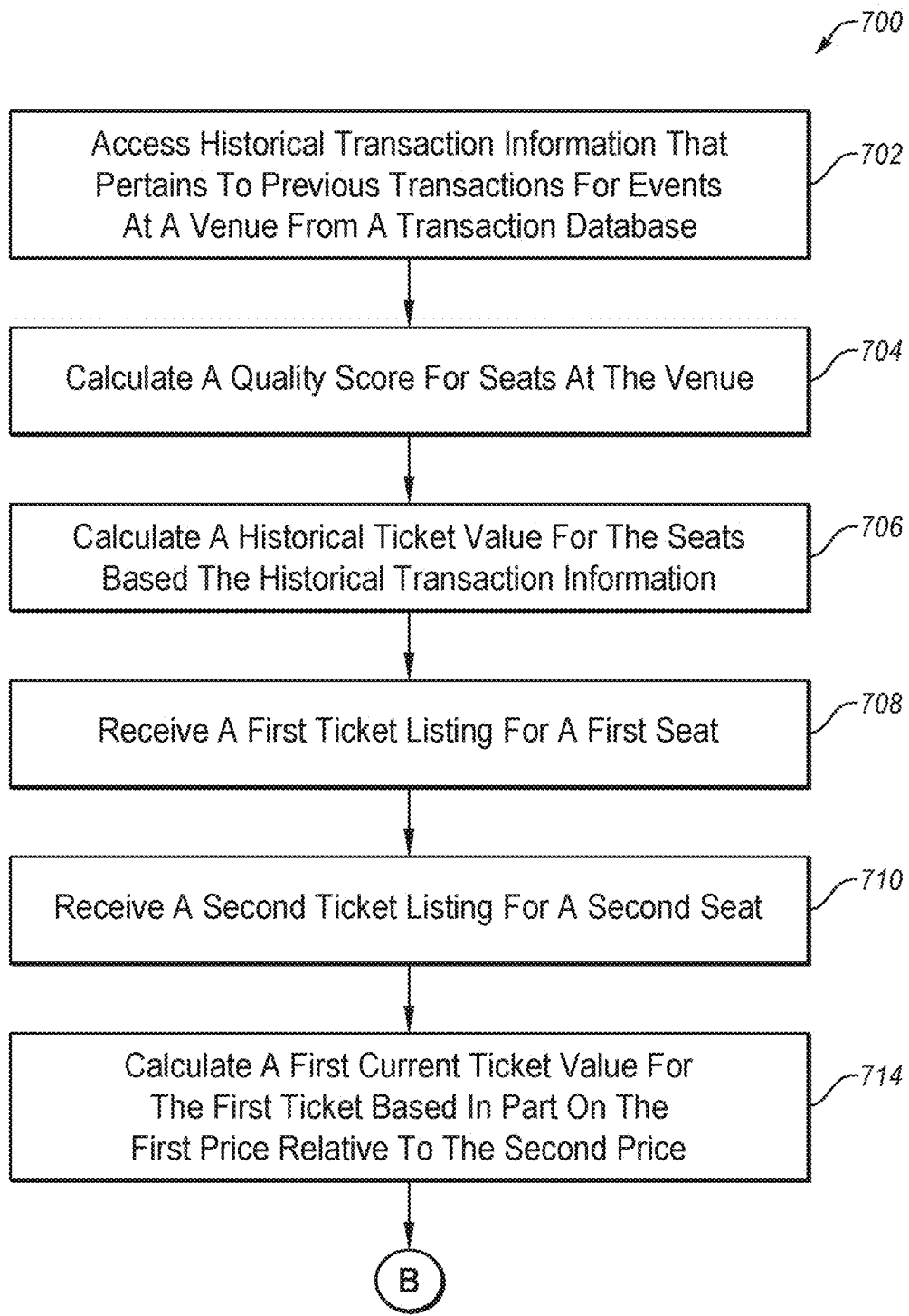
FIGS. 7A and 7B illustrate another example method to determine a deal score.
Figure 7B:
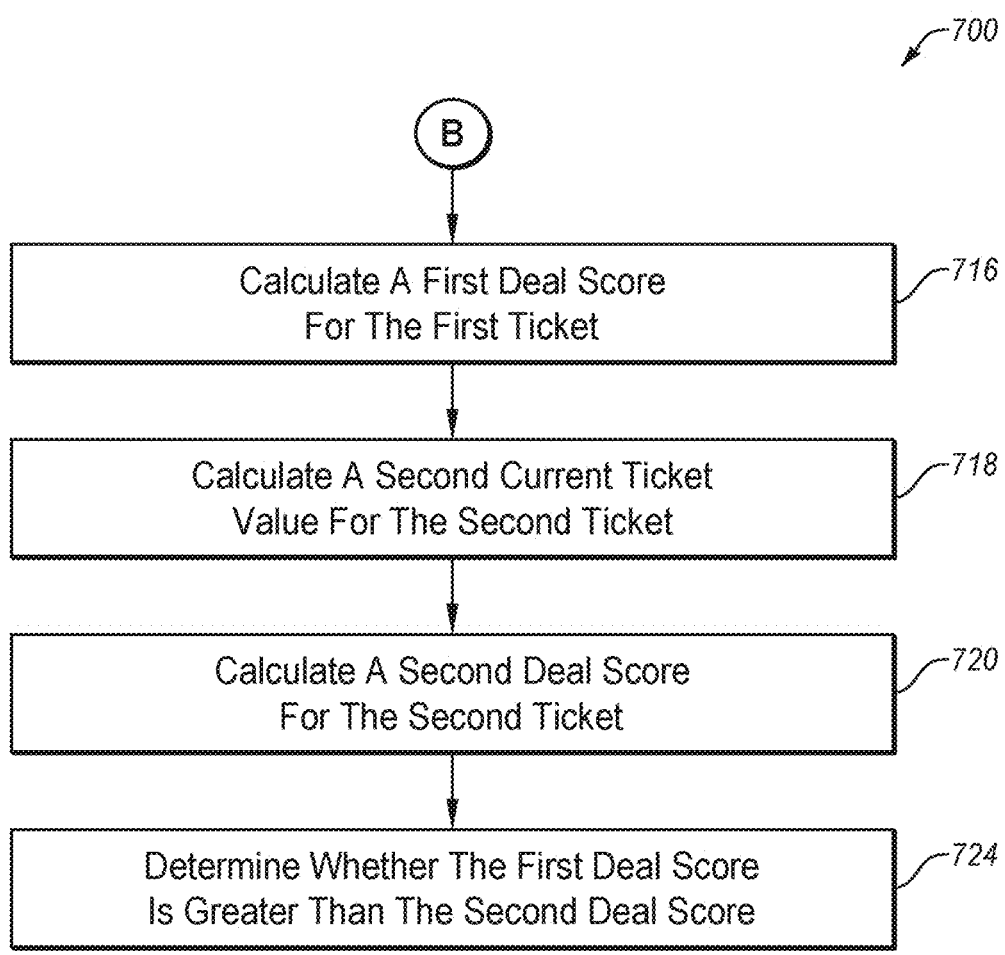

FIGS. 7A and 7B depict a flow chart of another example method 700 of ticket assessment in an online ticket marketplace. The method 700 may be performed in an operating system such as the operating system 100 of FIG. 1. In some embodiments, the method 700 may be performed before or during compilation of a multi-ticket package based on a request from a user.

The method 700 may begin at block 702 in which historical transaction information may be accessed that pertains to previous transactions for events at a venue from a transaction database.

At block 704, a quality score may be calculated for seats at the venue. The quality score may be calculated based at least in part on seat locations and the historical transaction information. The quality scores may be indicative of an experience of a user positioned in the seat during events. In some embodiments, calculation of the quality score for the seats is further based on at least one fixed metric, a distance from a point of interest of the venue to the seats, and may include ranking the plurality of seats in order of most expensive to least expensive average price based on the historical transaction information for the venue. In some embodiments, the quality score may be calculated for all seats in the venue, or for all seats in the venue with a listing, or for a particular seat in the venue.

At block 706, a historical ticket value may be calculated for the seats. The historical ticket value may be calculated based on the historical transaction information. The historical ticket value may be indicative of historical prices paid for tickets for each of the seats relative to historical prices paid for tickets for each of the other seats. In some embodiments, calculation of the historical ticket value for the seats includes calculation of a monetary downgrade value of each of the seats according to a downgrade value expression described elsewhere in this disclosure.

At block 708, a first ticket listing may be received for a first seat of the seats. The first ticket listing may include a first price for a first ticket that reserves the first seat during an upcoming event. The first ticket listing may be received from a first user device associated with a first seller entity.

At block 710, a second ticket listing may be received for a second seat of the seats. The second ticket listing may include a second price for a second ticket that reserves the second seat during the upcoming event. The second ticket listing may be received from a second user device associated with a second seller entity.

At block 714, a first current ticket value may be calculated for the first ticket based in part on the first price relative to the second price. In some embodiments, the calculating the first current ticket value is further based on an average price difference between the first price and prices of other tickets for at least a subset of the plurality of seats.

With reference to FIG. 7B, at block 716, a first deal score may be calculated for the first ticket based on the first current ticket value relative to the historical ticket value for the first seat. The first deal score may be indicative of whether the first ticket is overpriced or underpriced. At block 718, a second current ticket value may be calculated for the second ticket based on the second price relative to the first price.

At block 720, a second deal score may be calculated for the second ticket based on the second current ticket value relative to the historical ticket value for the second seat. The second deal score may be indicative of whether the second ticket is overpriced or underpriced. At block 724, it may be determined whether the first deal score is greater than the second deal score.

Modifications, additions, or omissions may be made to the method 700 without departing from the scope of the present disclosure. For example, the operations performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Blending Tickets from Primary and Secondary Sellers

Some embodiments herein relate to operations to blend electronic inventory at an online ticket market. For example, a multi-ticket package may include two tickets to three events where the first two tickets to the first event and one of the tickets to the second event are from a primary seller, and the second ticket to the second event and the two tickets to the third event is from a secondary seller. Consistent with the present disclosure, a user may observe the multi-ticket package as a single transaction, despite the tickets coming from multiple sources.

Online ticket markets provide a place for sellers of seats at venues to post and sell their seats to buyers. In some circumstances, the sellers that participate on an online ticket marketplace for a given venue may include the venue itself and others that are reselling seats purchased from the venue. As used herein, a venue selling its own seats may be referred to in this disclosure as a primary seller. For example, for a game at venue X, venue X or the owner of venue X selling seats for the first time for the event may be referred to as the primary seller. Other sellers that resell seats previously purchased for the venue may be referred to in this disclosure as secondary sellers.

In some circumstances, online ticket markets may sell seats from both a primary seller and one or more secondary sellers for a single event. Systems and methods described in this disclosure may describe how an online ticket marketplace may blend tickets from multiple different sellers to construct a multi-ticket package such that a buyer may purchase tickets from multiple different sellers in a single transaction without being aware that the buyer is purchasing tickets from multiple sellers. In these and other embodiments, the multiple sellers may be a combination of multiple different secondary sellers or a combination of a primary seller with one or more secondary sellers.

Blending seat inventory from multiple sellers presents various technical hurdles that some embodiments in this disclosure may address. For example, ticket data from multiple sources may be formatted differently, which may make it difficult to store the data in a single database to allow the online ticket marketplace to perform searches in real-time based on inputs from potential buyers. Other hurdles involve verifying with multiple systems that seats are still available before purchases are completed as some sellers may offer seats for sale on multiple different online ticket marketplaces, either hosted by third parties or by themselves. Thus, this disclosure provides technical advances in database management and systems verification as related to online ticket marketplaces.

For example, in some embodiments, blending inventory by an online ticket marketplace may include the online ticket marketplace obtaining first data regarding seats for sale from a first system of a primary seller and formatting the first data into first data objects for storage in a data store. The first data objects may be tagged with a first tag to indicate that they are from the primary seller.

Alternately or additionally, the online ticket marketplace may obtain second data regarding seats for sale from a second system of a secondary seller. The second data may be formatted into second data objects for storage in the data store with the first data objects. The second data objects may be tagged with a second tag to indicate that they are from the secondary seller.

To correctly input data received from a seller, such as a first data or second data, into the data storage, data received from a seller may first be parsed to determine the aspects of the individual seats included in the data. By parsing the data, a price may be correlated with each of the seats, such that each data object for each seat includes a price.

In some embodiments, the data from different sellers may be formatted differently. Thus, after parsing data from different sellers, the data may be formatted before being placed in the data storage. Before, after, or while being saved in the data storage, each of the data objects that receive seat information may be tagged with an origin of the seat. The origin of the seat may indicate a seller/system that provided the data to the data storage. In some embodiments, the tag may also include an identifier of the seat used by the system that provided the seat information. In these and other embodiments, the information in the tag may be used after a purchase request by the system that includes the data storage to verify that the seat is still available for purchase. For example, the tag may be used to identify a seller/system that provided the seat and to obtain the identifier of the seat used by the seller. After identifying the seller/system, a notification regarding the availability of the seat that includes the identifier of the seat used by the seller/system may be provided to the seller/system.

In some embodiments, each of the sellers of the seats in a combination may have priced their seats differently. For example, the seats from a primary seller may have a price x, and seats from a secondary seller may have a price y. When presented to the buyer as a combination, the marketplace system may determine an average price of the seats based on the prices. For example, to determine a total price for the combination, the price x and the price y may be added together. A price per seat may be the total price divided by the number of seats. By providing the average price per seat, each seller receives their requested price amount without the buyer necessarily knowing about the price difference as set by the sellers. With respect to a multi-ticket package, after the price per seat is determined for the seats to an event, the same process may be repeated for each event of the multi-ticket package. The price per seat across each event may then be averaged across all events of the multi-ticket package. Additionally or alternatively, each individual seat for each of the events may be summed together and then divided by the total number of seats across all events. In some embodiments, a user may be presented with the average price per seat, per event, or the total price.

After input of the data from the sellers into the database, a request for seats may be received at the online ticket marketplace from a third system of a buyer. For example, a buyer may request four seats in a particular location of a venue for one or more events in the venue of a multi-ticket package. The data store may be searched to find combinations of seats that meet the buyer's request. The seats may be searched irrespective of the sellers that own the seats. As a result, a four seat combination for one or more events in the venue that may meet the buyer's request may include seats from a primary seller and one or more secondary sellers. The combinations of seats may be provided to the buyer for review by the buyer. The online ticket marketplace may provide the combination of seats in a manner such that the buyer is unaware that the seats are owned by different parties. For example, the seats may be packaged together and presented in a manner to not distinguish between the origins of the seats such that the buyer may purchase the seats in a single transaction and without knowing that the seats in the single seat combination and package are owned by different parties. In some embodiments, such a combination of seats may include seats to one event of a multi-ticket package from a primary seller and other tickets in the same multi-ticket package from a secondary seller.

In some embodiments, a buyer may request to purchase a combination of the seats presented. Because the data store is not continuously updated with information from the primary and secondary sellers, the online ticket marketplace may verify with the first and second systems of the primary and secondary sellers that the seats are still available before confirming the purchase request. In these and other embodiments, the online ticket marketplace may identify the sellers with seats in the requested combination of seats based on the tags in the data objects associated with the seats in the requested combination. The online ticket marketplace may send notifications to the systems of the sellers and confirm the purchase request based on the responses from the systems of the sellers. In these and other embodiments, if a single seller indicates that the tickets are not for sale, the online ticket marketplace may deny the purchase request.

In some embodiments, a computing system (such as the marketplace system 110 of FIG. 1 and/or the transaction DB 116 of FIG. 1) may store data entries regarding a variety of seats as data objects in the computing system. For example, the computing system may tag data from a primary seller with a first tag. The computing system may tag data from a secondary seller with a second tag. The first and second tags may identify the source of the data in the data object. In some embodiments, the first and second tags may include identifiers from the primary seller and/or the secondary seller to allow the primary seller and/or the secondary seller to readily identify the seat associated with the identifier.

A user device (such as the user devices 104 of FIG. 1) may be configured to present seats on webpages without differentiating between the sellers of the seats. For example, a webpage may be generated that presents available seats for purchase in a map of a venue. The webpage may not differentiate between sellers of the seats. Thus, all seats available for sale may be presented in the same manner. Thus, seats from a primary seller and seats from a secondary seller may be presented in the same manner.

In some embodiments, the user device may request a number of seats from a marketplace system. Based on the request, the marketplace system may determine combinations of seats that meet the request, including across multiple events. In these and other embodiments, the marketplace system may search the data storage to determine clustering of seats that meet the request. When determining the combination of the seats, the marketplace system may determine the combination irrespective of the sellers of the seats. For example, during the search, the marketplace system may not consider the tags of the data objects that distinguish the seller of the seats. Thus, seat combinations that meet the request may include one or more seats provided by a primary seller and/or one or more seats provided by a secondary seller.

The marketplace system may present the combinations of seats that fulfill the seat request to the user device. The user device may receive and present the combinations of seats. The combination of seats may be presented in a manner that does not distinguish between seats associated with different sellers. The user device may issue a single purchase request to the marketplace system for the combination of seats. The purchase request may be a single request for a single transaction with a single seller from the perspective of the user device as the user device may not be aware that the seats in the combination of seats are from different sellers.

The marketplace system may receive the purchase request. In some embodiments, the marketplace system may have authorization to sell the seats in the combination. In these and other embodiments, the seats may not be being sold through other seats vendors such that the marketplace system knows that the seats are available. In these and other embodiments, the marketplace system may authorize the transaction.

In some embodiments, one or more of the seats in the combination may be being sold through other vendors such that the marketplace system does not know that the seat is available. For example, the marketplace system may refresh the available seats based on updated data from the primary seller and/or the secondary seller. In these and other embodiments, between when the marketplace system refreshes the available seats, a seat may be sold by another online ticket marketplace such that the seat is not available for resale again. Thus, before confirming the purchase of the seat, the marketplace system may verify with the origin of the seat that the seat is still available for purchase.

To verify with the origin of the seat, the marketplace system may locate the data objects of the requested seats in the data storage. Based on the tags of the data objects, the marketplace system may obtain the origin of the seat. In these and other embodiments, the marketplace system may send a notification to the system from which the seat originates regarding holding the seat or the availability of the seat. Based on a response from the system, the marketplace system may provide confirmation of the purchase request or deny the purchase request.

For example, when the data object includes a first tag, the marketplace system may send a notification to the primary seller regarding holding the seat or the availability of the seat. The primary seller may confirm the availability or that the seat is held to the marketplace system. In response, the marketplace system may send a confirmation of the purchase request to the user device.

In some embodiments, the seat combination may include seats from multiple sellers. In these and other embodiments, the marketplace system may perform a verification process with each of the different sellers. As a result, the marketplace system may perform a verification process with multiple systems. To perform the verification, the marketplace system may locate the data objects of the requested seats in the data storage. Based on the tags of the data objects, the marketplace system may obtain the origins of the seats. In these and other embodiments, the marketplace system may send a notification to the systems from which the seats originate regarding holding the seats or the availability of the seats. After all of the responses are received and all of the responses indicate that all of the seats are available, the marketplace system may confirm the request. If one or more of the systems responds and indicates that a seat is not available, the purchase request may be denied, as the combination of seats would not be available.

In some embodiments, the different components, modules, engines, and services described herein may be implemented as objects or processes that execute on a computing system (e.g., as separate threads). While some of the system and methods described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc., connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A system, comprising:
    one or more processors; and
    a memory, storing multiple instructions which, when executed by the one or more processors, cause the system to:
    receive a filter criteria selection designating a first event and a second event at a venue;
    generate a package data object by executing a first process to add a first ticket for a first seat in a section of the venue for the first event while in parallel executing a second process to add a second ticket for a second seat in the section of the venue for the second event, the first seat being associated with a first listing and the second seat being associated with a second listing independent of the first listing;
    transmit multiple instructions to generate a display of the venue hosting the first event and the second event, the display of the venue including an average price for the first ticket and the second ticket;
    receive a single selection request to purchase both the first ticket and the second ticket of the package data object through the single selection request; and
    prior to completing the purchase of both the first ticket and the second ticket, confirm an availability of the first ticket and the second ticket.

2. The system of claim 1, wherein the one or more processors further execute instructions to, based on a received confirmation of the availability of the first ticket and the second ticket and the single selection request, purchase both the first ticket and the second ticket.

3. The system of claim 1, wherein the one or more processors further execute instructions to, based on the filter criteria selection:
    retrieve a first entry and a second entry from the memory, the first entry and the second entry each including a plurality of attributes, the first entry and the second entry sharing a common value for at least one of the plurality of attributes;
    compare one or more attributes of the first entry and the second entry to determine which of the first entry and the second entry has a greater deal score, a deal score based at least on a current ticket value relative to a historical ticket value; and
    based on the first entry having a greater deal score, add the first entry from the memory to the package data object.

4. The system of claim 1, wherein the one or more processors further execute instructions to determine a numerical average of a price attribute of entries in the package data object.

5. The system of claim 1, further comprising an interactive display configured to illustrate a venue corresponding to a venue attribute in the package data object, the interactive display including a plurality of regions including a region corresponding to a region attribute in the package data object.

6. A method comprising:
receiving a filter criteria selection designating a first event and a second event at a venue;
generating a package data object by executing a first process to add a first ticket for a first seat in a section of the venue for the first event while in parallel executing a second process to add a second ticket for a second seat in the section of the venue for the second event, the first seat being associated with a first listing and the second seat being associated with a second listing independent of the first listing;
transmitting multiple instructions to generate a display of the venue hosting the first event and the second event, the display of the venue including an average price for the first ticket and the second ticket;
receiving a single selection request to purchase both the first ticket and the second ticket of the package data object through the single selection request; and
prior to completing the purchase of both the first ticket and the second ticket, confirming an availability of the first ticket and the second ticket, wherein the first ticket is selected using an algorithm to determine a first deal score for the first ticket and a third deal score for a third ticket, the third ticket associated with a third seat in the section of the venue for the first event, the first ticket selected based on the first deal score being greater than the third deal score, and the first deal score determined during a period of time determined to include a lull of activity in a computing system performing the method.

7. The method of claim 6, further comprising, based on a received confirmation of the availability of the first ticket and the second ticket and the single selection request, purchasing both the first ticket and the second ticket.

8. The method of claim 6 further comprising, in response to a determination that the first ticket is not available:
determining a replacement ticket for the first ticket;
determining a first deal score for the replacement ticket;
determining a third deal score for a third ticket in the section of the venue; and
selecting the replacement ticket instead of the third ticket based on a determination that the first deal score is greater than the third deal score.

9. The method of claim 8, wherein the replacement ticket is selected based on the first deal score of the replacement ticket being a greatest deal score of all available tickets in the section of the venue for the first event.

10. The method of claim 8 further comprising generating the instructions to update a user interface to display a purchase price for the replacement ticket and the third ticket.

11. The method of claim 6, wherein the first ticket is from a primary seller and the second ticket is from a secondary seller.

12. The method of claim 6, further comprising:
tracking previous interactions of a user with an electronic commerce system, the electronic commerce system including the first listing and the second listing; and
automatically determining one or more user preferences based on the previous interactions of the user with the electronic commerce system,
wherein the first ticket is selected instead of a third ticket based on the first ticket being consistent with the one or more user preferences.

13. The method of claim 6, wherein the display of the venue includes display of a plurality of sections, the plurality of sections including the section, and wherein each of the plurality of sections includes at least one available ticket to each of the first event and the second event, and each of the plurality of sections includes a numerical representation of the average price of a first event ticket with a greatest deal score in a respective section and a second event ticket with the greatest deal score in the respective section.

14. The method of claim 6, wherein the filter criteria selection is configured to selectively filter a plurality of events at a plurality of venues including a subset of the plurality of events that includes the first event and the second event, the filter criteria selection identifying one or more attributes common to the first event and the second event.

15. The method of claim 6, further comprising determining a numerical average of a price attribute of entries in the package data object.

16. A non-transitory, computer readable medium, containing instructions that, when executed by one or more processors, are configured to cause a system to perform operations, the operations comprising:
receiving a filter criteria selection designating a first event and a second event at a venue;
generating a package data object by executing a first process to add a first ticket for a first seat in a section of the venue for the first event while in parallel executing a second process to add a second ticket for a second seat in the section of the venue for the second event, the first seat associated with a first listing and the second seat associated with a second listing independent of the first listing;
transmitting the instructions to generate a display of the venue hosting the first event and the second event, the display of the venue including an average price for the first and the second ticket;
receiving a single selection request to purchase both the first ticket and the second ticket of the package data object through the single selection request; and
prior to completing the purchase of both the first ticket and the second ticket, confirming an availability of the first ticket and the second ticket, wherein the first ticket is selected using an algorithm to determine a first deal score for the first ticket and a third deal score for a third ticket, the third ticket associated with a third seat in the section of the venue for the first event, the first ticket selected based on the first deal score being greater than the third deal score, and the first deal score determined during a period of time determined to include a lull of activity in a computing system performing the operations.

17. The non-transitory, computer readable medium of claim 16, wherein the first ticket is selected using an algorithm to determine a first deal score for the first ticket and a third deal score for a third ticket, the third ticket associated with a third seat in the section of the venue for the first event, the first ticket selected based on the first deal score being greater than the third deal score, and the first deal score determined during a period of time determined to include a lull of activity in the system.

18. The non-transitory, computer readable medium of claim 16, wherein the operations further comprise, in response to a determination that the first ticket is not available:
determining a replacement ticket for the first ticket;
determining a first deal score for the replacement ticket;
determining a third deal score for a third ticket in the section of the venue; and selecting the replacement ticket instead of the third ticket based on a determination that the first deal score is greater than the third deal score.

19. The non-transitory, computer readable medium of claim 16, wherein the first ticket is from a primary seller and the second ticket is from a secondary seller.

20. The non-transitory, computer readable medium of claim 16, wherein the operations further comprise:
tracking previous interactions of a user with an electronic commerce system, the electronic commerce system including the first listing and the second listing; and
automatically determining a user preference based on the previous interactions of the user with the electronic commerce system,
wherein the first ticket is selected instead of a third ticket based on the first ticket being consistent with the user preference.

* * * * *